United States Patent [19]
Marshall

[11] Patent Number: 5,640,775
[45] Date of Patent: Jun. 24, 1997

[54] DETERMINING AND MARKING APPARATUS AND METHOD FOR USE IN OPTOMETRY AND OPHTHALMOLOGY

[76] Inventor: Forrest A. Marshall, P.O. Box 649, Dublin, Ga. 31021

[21] Appl. No.: 198,140

[22] Filed: Feb. 17, 1994

Related U.S. Application Data

[63] Continuation-in-part of Ser. No. 948,140, Sep. 18, 1992, Pat. No. 5,335,419, which is a continuation-in-part of Ser. No. 739,616, Aug. 2, 1991, Pat. No. 5,148,602, which is a continuation-in-part of Ser. No. 642,299, Jan. 17, 1991, Pat. No. 5,046,257, which is a continuation-in-part of Ser. No. 467,269, Jan. 19, 1990, Pat. No. 5,036,592.

[51] Int. Cl.$^6$ ................................... B43L 13/00
[52] U.S. Cl. ................................... 33/28; 33/200
[58] Field of Search ................................... 33/28, 200, 507, 33/286; 351/200, 204, 205, 211, 221, 222, 223, 231

[56] References Cited

U.S. PATENT DOCUMENTS

| | | |
|---|---|---|
| 1,750,731 | 3/1930 | Smith . |
| 1,751,425 | 3/1930 | Smith . |
| 2,491,312 | 12/1949 | Henry et al. . |

(List continued on next page.)

FOREIGN PATENT DOCUMENTS 239 4827  1/1979  France .

OTHER PUBLICATIONS

Rosner, "How to Troubleshoot Progressive Lens Problems," Review of Optometry, 45–46 (Feb. 1990).
An advertisement entitled "Trust Their Promises or Believe Your Own Eyes," for Sola Optical USA, Inc. (Date unknown).
An advertisement entitled "Your Dream. We Deliver.," for American Optical. (Date unknown).
P. 29 of the U.S. optical Spring '90 catalog (1990).
Pp. 79–80 of the Western Optical Ophthalmic Instrument Catalog 1989/1990.
Three photographs of the Grolman Fitting System (Date unknown).
Two photographs of a pupilometer and pupilary distance ruler (Date unknown).
Chapter 28 of Borish, *Clinical Refraction* (3d ed. 1970), "Bifocals, Multifocals, and Progressive Addition Lenses."
Borish, Hitzeman, and Brookman, "Double Masked Study of Progressive Addition Lenses," *Journal of the American Optometric Association* 933–43 (vol. 10, No. 51, 1980).
Rosner, "How to Troubleshoot Progressive Lens Problems," *Review of Optometry*, 45–46 (Feb. 1990).

*Primary Examiner*—Christopher W. Fulton
*Attorney, Agent, or Firm*—Dean W. Russell; Kilpatrick Stockton LLP

[57] ABSTRACT

An apparatus and method for subjectively (and in some cases at least partially objectively) determining the proper positioning of progressive power or other corrective lenses are disclosed. The apparatus includes a target such as a small fiber optic or other light source and one or more marking rods which may be activated by the patient (or, in some cases, by the practitioner). While wearing pre-fitted frames and fixating on a remote target, the patient (or practitioner) places the light source against or immediately adjacent the exterior surface of the simulated or other lens within either of the frames and positions the light so that it is centered in the patient's line of sight. Once the light is centered the marking rod is activated which contacts, and marks, the exterior surface of the lens. Because in some embodiments of the apparatus the light source and marking rod or rods are designed to obstruct very little of the patient's vision, his or her peripheral vision remains intact during the process, thereby allowing binocular fusion to occur and avoiding introduction of phoria errors into the positioning process. Other embodiments omit the marking rods but can be attached (temporarily) to the pre-fitted frames for later marking using conventional markers.

11 Claims, 14 Drawing Sheets

U.S. PATENT DOCUMENTS

| | | |
|---|---|---|
| 2,536,367 | 1/1951 | Holmes . |
| 2,884,702 | 5/1959 | Engelmann . |
| 2,884,832 | 5/1959 | Engelmann . |
| 3,987,554 | 10/1976 | Pastore . |
| 4,115,924 | 9/1978 | Kleinkopf . |
| 4,121,346 | 10/1978 | Grolman et al. . |
| 4,160,330 | 7/1979 | Grolman . |
| 4,206,549 | 6/1980 | Gould . |
| 4,216,588 | 8/1980 | Richards . |
| 4,252,419 | 2/1981 | Padula II et al. . |
| 4,575,946 | 3/1986 | Bommarito . |
| 4,653,192 | 3/1987 | Conrad et al. . |
| 4,944,585 | 7/1990 | Mizuno . |
| 4,977,675 | 12/1990 | Jewett, Sr. . |
| 5,036,592 | 8/1991 | Marshall . |
| 5,037,193 | 8/1991 | Funk . |
| 5,046,257 | 9/1991 | Marshall . |
| 5,148,602 | 9/1992 | Marshall . |
| 5,167,074 | 12/1992 | Weiss . |
| 5,335,419 | 8/1994 | Marshall . |

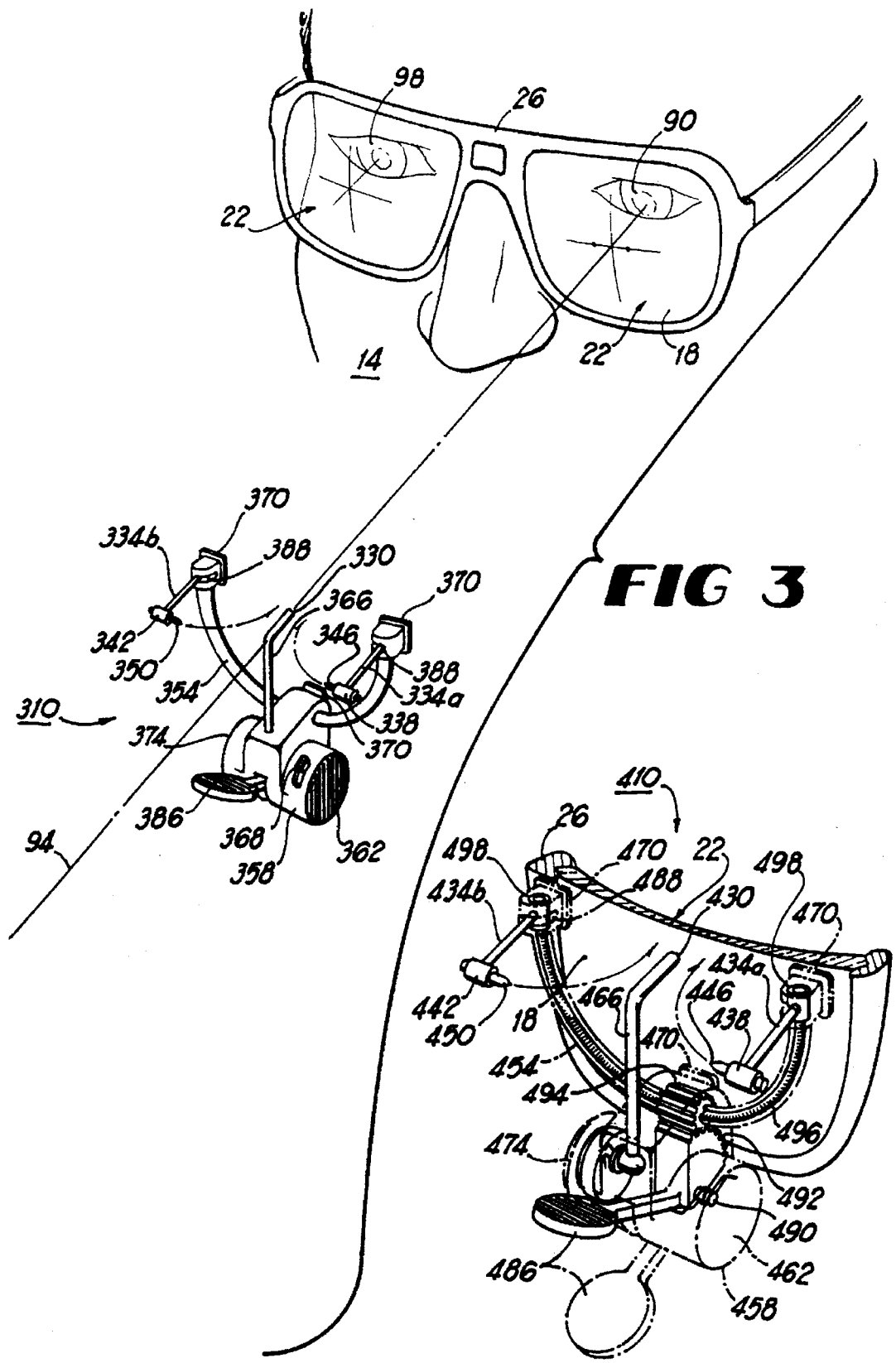

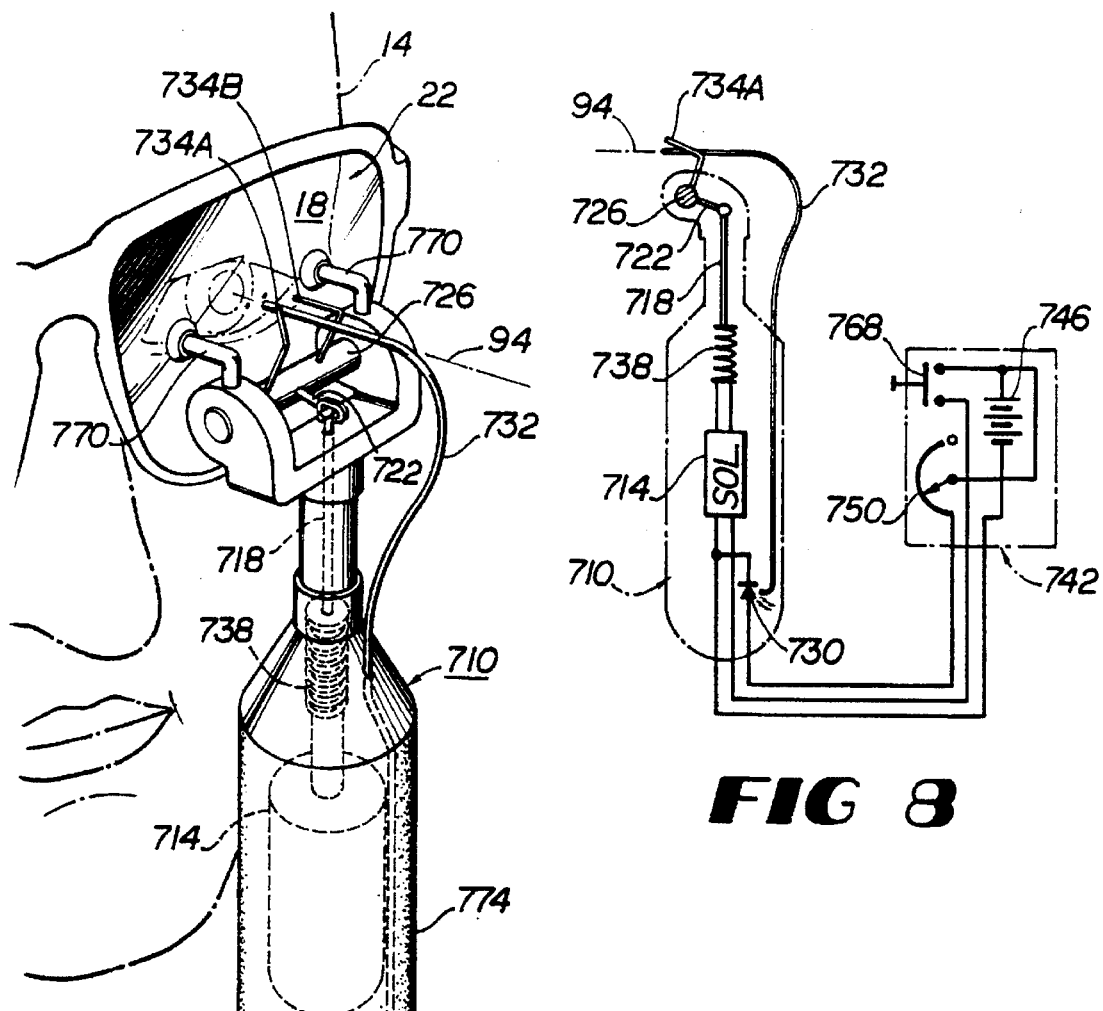
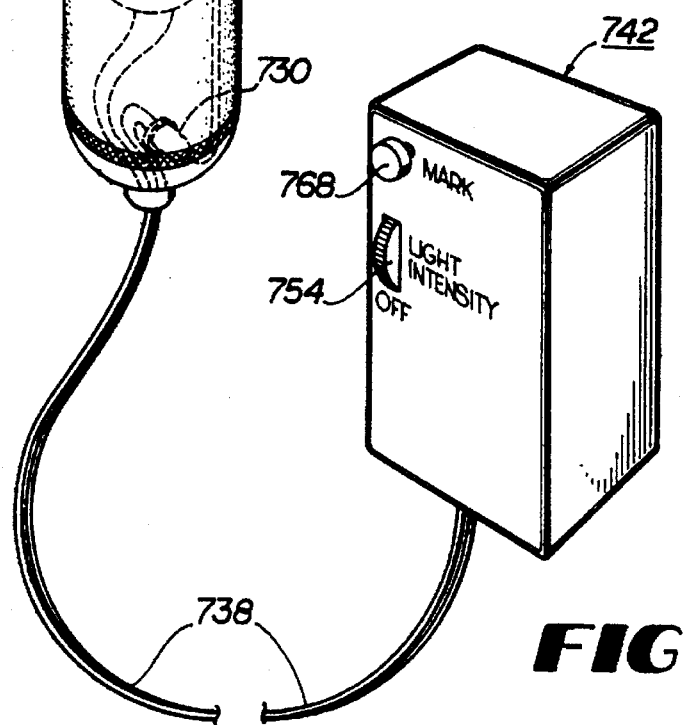
FIG 8
FIG 7

DETERMINING AND MARKING APPARATUS AND METHOD FOR USE IN OPTOMETRY AND OPHTHALMOLOGY

CROSS REFERENCE TO RELATED APPLICATIONS

This application is a continuation-in-part of application Ser. No. 07/948,140, filed Sep. 18, 1992, (now U.S. Pat. No. 5,335,419), which is a continuation-in-part of application Ser. No. 07/739,616, filed Aug. 2, 1991 (now U.S. Pat. No. 5,148,602), which is a continuation-in-part of application Ser. No. 07/642,299, filed Jan. 17, 1991 (now U.S. Pat. No. 5,046,257), which is a continuation-in-part of application Ser. No. 07/467,269, filed Jan. 19, 1990 (now U.S. Pat. No. 5,036,592), each having the same title and each incorporated herein in its entirety by this reference.

FIELD OF THE INVENTION

The invention relates to apparatus and techniques for subjectively (and in some cases at least partially objectively) determining relationships between patients' pupils and locations on corresponding multi-focal spectacle lenses.

BACKGROUND OF THE INVENTION

Multi-focal lenses, frequently used for remedying presbyopia, contain two or more regions of differing corrective power. An early attempt at constructing multi-focal lenses involved joining pieces of two separate lenses, one positioned above the other, within the eyewires of each of a patient's left and right spectacle frames. Called "Franklin Bifocals," these lenses included distinct horizontal lines demarcating the boundary between the joined lens pieces in each frame. The sharp dividing lines were cosmetically unattractive, however, and the lenses themselves were mechanically weak.

More modern bifocal designs provide far- and near-viewing correction for each eye using a single lens fitted into the eyewire of the corresponding spectacle frame. Typically designed to correct the distance vision of the patient, the single lens includes a cavity or countersink ground into either its front or rear surface. A separate segment button is fused to the countersink to provide the appropriate additive power for near vision correction. Alternatively, the distance prescription may be ground on one surface of a single lens and the power of the addition ground on the other. Each of these designs supplies lenses mechanically stronger than the Franklin bifocal; the designs do not, however, eliminate the unattractive boundary visible between the two prescriptive surfaces. Use of these conventional bifocals also causes patients to experience blurriness in zones corresponding to the demarcation lines as the patients move their eyes vertically.

Progressive power lenses, also known as "invisible" bi- or tri-focal lenses, eliminate the discontinuities visible in other multi-focal designs and resulting vertical blurriness by continuously varying the corrective power throughout particular regions of single lenses. Such progressive power lenses effectively disguise their multi-focal nature by blending adjacent prescriptive curves through grinding and polishing techniques. Blending adjacent curves introduces other optical distortions, however, creating, for some patients, unwanted astigmatism or vertical prism imbalance. Progressive power lenses also typically contain narrow optical corridors connecting the distance and near viewing areas, reducing the peripheral clarity, and resulting comfort level, of many wearers.

An important consideration in accommodating invisible bifocal lenses to the eyes of patients involves orienting the visual axes of the eyes at the optical thresholds where the progressive powers begin. In other words, as the left and right eyes move together vertically in the progressive pathways, they should encounter parts of the invisible bifocal lenses of the same progressive power. This result depends in part on the choice of spectacle frames and whether the respective dimensions of the frames allow accurate centering of the lenses with respect to patients' pupils. Proper alignment also depends on the technique used to determine the centers of the patients' pupils.

A variety of devices exist for assisting a practitioner in objectively determining the centers of a patient's pupils relative to predetermined locations while the patient's head is in its primary position. One such device, the "Multi-Purpose Measuring Device" provided by the Varilux Corporation, is a transparent, lined overlay having a pointed bottom which is designed to adhere temporarily to a patient's spectacle frames. While facing the sitting or standing patient who is wearing spectacles, the practitioner places the pointed end of the measuring device in the deepest point of one of the left or right frames. The practitioner subsequently attempts to align his or her line of sight with the eye of the patient corresponding to the frame containing the measuring device and marks the pupil center on the measuring device using a washable felt tip pen. The practitioner can then read the vertical distance from that pupil center to the frame bottom from the markings on the measuring device. The vertical distance from the center of the patient's other pupil relative to the frame bottom may be determined similarly.

To measure the horizontal distance from the patient's pupil center to a particular location, typically the bridge of the patient's nose, the practitioner orients a measuring device resembling a conventional ruler approximately parallel to the floor and places it slightly above the patient's nose bridge. The practitioner then sights along an imaginary vertical line intersecting the center of one pupil and, using the measuring ruler, determines the horizontal distance from the pupil center to the bridge of the nose. Similarly, the horizontal distance between the pupil center of the other eye and the bridge of the nose may be determined by sighting along an imaginary vertical line intersecting the other pupil.

These measuring techniques lack the precision necessary to position invisible bifocals suitably for many patients. At least a portion of the patient's pupil is obstructed by the lined overlay, decreasing both the patient's ability to focus appropriately and the practitioner's ability to locate the pupil center. Parallax presents another problem, as the practitioner often cannot precisely align his or her line of sight with that of the patient. Because no concrete structure exists against which the practitioner can verify that the visual axis measurements are accurate, errors made in determining the pupil centers cannot be corrected before the prescriptive spectacle lenses are made.

U.S. Pat. No. 4,206,549 to Gould, which patent is incorporated herein in its entirety by this reference, discloses another objective device for determining the centers of a patient's pupils. The Gould device overcomes some of the disadvantages of other techniques by using a transparent plate with a small target mark that may be magnetically clamped to a lens. Initially, a patient is fitted with a pair of spectacle frames, many of which frames are provided to the practitioner with plane simulated lenses in place. If such spectacles lack these "demonstrator" lenses, plane simulated lenses may be formed by cutting a sheet of plastic or similar material and secured in the spectacle frames. The transparent plate subsequently is attached to either the left or right frame (and later to the other frame if necessary) using sets of magnets located on the opposite surfaces of the lens, and the practitioner aligns the target mark with the center of the patient's pupil by sliding the transparent plate across the lens until he or she believes that the target mark is aligned with the patient's visual axis. Although not disclosed in Gould, presumably the frames are removed from the patient's head and a mark is made on the interior surface of the lens corresponding to the location of the target mark.

Once the lens mark is made the plate presumably is removed and a small spot of fluorescent paint is placed on the contra-ocular surface of the simulated lens coincident with the recording mark. The practitioner then aligns himself or herself with the patient and sights the luminous spot to determine if the recording marks are aligned with the center of the pupil. Alternatively, light may be projected on the luminous spot from a position at an angle to the visual axis of the simulated lens. The patient while fixating at infinity views the colored spot and can inform the practitioner whether the mark is properly aligned with the visual axis.

Because the practitioner makes the initial determination of the pupil center in each case, parallax and other misalignment problems-both in sighting along the patient's visual axis and in marking the location of the target mark on the lens surface-remain when using the Gould device. Any bias present in the practitioner's sighting tendencies also affects the resulting measurement, as does any similar predisposition associated with the practitioner's lens marking capabilities. The friction caused by sliding the magnetically clamped plate across the lens surface may cause slight movement of the spectacle frames from their normal position, further decreasing the accuracy of the determination of the relationship between the pupil center and corresponding lens. For patients having long eyelashes or whose spectacle lenses normally are worn close to their eyes, the magnets on the interior surface of the lenses also may contact their eyelashes and cause the patients difficulty in focusing during the examination. Finally, although the patient may confirm the work of the practitioner by noting whether the fluorescent spots align, misalignment does not necessarily provide the practitioner with additional information to increase the probability of proper alignment during the next iteration of the examination.

The Gould patent also discloses a subjective embodiment in which an opaque plate having a pinhole may be magnetically clamped to the lens. The patient may then sight at an appropriately positioned remote light source or target while adjusting the plate until the light source or target is seen through the pinhole. Each pinhole location subsequently is marked, presumably on the interior surface of the lens, by the practitioner after removing the frames from the patient's head. While this embodiment minimizes the effects of parallax when aligning the pinhole and pupil center, it does not diminish the parallax problems associated with marking the location of the pinhole on the lens, nor does it reduce the other obstacles related to use of the objective embodiment of the Gould device. Moreover, because the opaque plate of the subjective embodiment blocks the patient's peripheral vision, binocular fusion cannot occur and phoria may be introduced.

SUMMARY OF THE INVENTION

The present invention provides simple, easy to use devices and associated methods for subjectively (and in some cases at least partially objectively) determining the proper positioning of progressive power or other lenses. Various embodiments of the devices, some of which are designed principally to be held by the patient, include a small light source and one or more patient-activated marking rods. The patient, while wearing the pre-fitted frames and fixating on a remote target (which itself may be illuminated for patients with extremely poor vision), places the light source against or immediately adjacent the exterior surface of the demonstrator lens within either of the frames and positions the light so that it is centered in his or her line of sight. Once the light is centered the patient activates the marking rods, which contact the exterior surface of the lens at two (or more) points equidistant from the center of the light source. By bisecting a real or imaginary line drawn to connect the two points on the simulated lens, the practitioner or lens maker (or even the patient) may precisely determine the location where the power change of the progressive power or other lens should begin.

The present invention avoids the problems associated with objective devices by allowing the patient to participate both in aligning the device and marking the lens. Furthermore, because the light source and marking rods of some embodiments are designed to obstruct very little of the patient's vision, his or her peripheral vision remains intact and allows binocular fusion to occur. The absence of magnets or any other foreign objects on the interior lens surface allows the patient to wear the spectacles in their normal position without regard to whether the objects will contact his or her eyelashes. Similarly, by not using magnetic or other clamping means within the field of view, the various embodiments of the present invention may be repositioned by the patient without causing movement of the spectacle frames themselves.

Because the invention relieves the practitioner of the tedium of measuring and marking the patient's visual axes, the practitioner's response to use of progressive power lenses should be more favorable. As noted in Borish, Hitzeman, and Brookman, *Double Masked Study of Progressive Addition Lenses,* in Journal of the American Optometric Association, vol. 51, no. 10, pp. 933–43 (October 1980), the potential acceptance of the progressive power lenses by the patient is colored by the enthusiasm of the practitioner suggesting their use. In addition, because the patient participates in the examination and determination of the lens location, he or she has greater incentive to adapt to the progressive power lenses. The combination of increased enthusiasm of both patients and practitioners should result in a greater acceptance of progressive power lenses generally.

Another device according to the invention is designed to be held and activated by the practitioner, although it too allows patient participation in the alignment process. A biased headrest associated with embodiments of this device additionally assists the patient in maintaining relatively constant head placement, reducing its movement during the procedure. Other features of these embodiments aid the practitioner in leveling the device and positioning it adjacent the lens to be marked.

It is therefore an object of the present invention to provide means for subjectively determining the appropriate position of a progressive power or other lens within a spectacle frame.

It is an additional object of the present invention to provide means for subjectively aligning a target with a patient's visual axis and marking a lens accordingly.

It is another object of the present invention to provide means for subjectively determining the appropriate positioning of a progressive power or other lens without introducing phoria caused by blocking the patient's peripheral vision.

It is yet another object of the present invention to provide simple, easy to use means for precisely determining the center of a patient's pupil relative to a lens within spectacle frames.

It is a further object of the present invention to provide means for increasing the acceptance level of progressive power lenses by allowing the patient to participate in determining the location of the lenses relative to the center of the pupils and reducing the effort required of the practitioner.

It is another object of the present invention to provide devices to be held and activated by the practitioner, although also allowing patient participation in the alignment process.

Other objects, features, and advantages of the present invention will become apparent with reference to the remainder of the written portion and the drawings of this application.

BRIEF DESCRIPTION OF THE DRAWINGS

FIG. 3 is a perspective view of a first alternate embodiment of the apparatus of the present invention.

FIG. 4 is a perspective view of a second alternate embodiment of the apparatus of the present invention.

FIG. 7 is a perspective view of a fifth alternate embodiment of the apparatus of the present invention.

FIG. 8 is an electro-mechanical schematic view of the apparatus of FIG. 7.

DETAILED DESCRIPTION OF THE DRAWINGS

Figure 1:
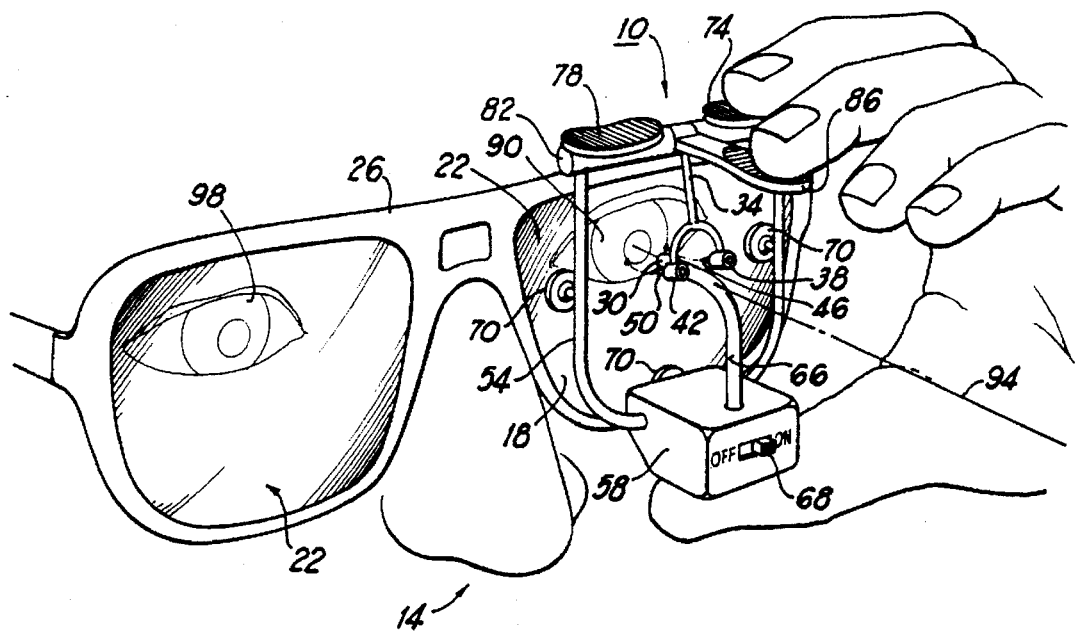
FIG. 1 is a perspective view of an embodiment of the apparatus of the present invention shown positioned by a patient adjacent the exterior surface of a spectacle lens.
Figure 2:
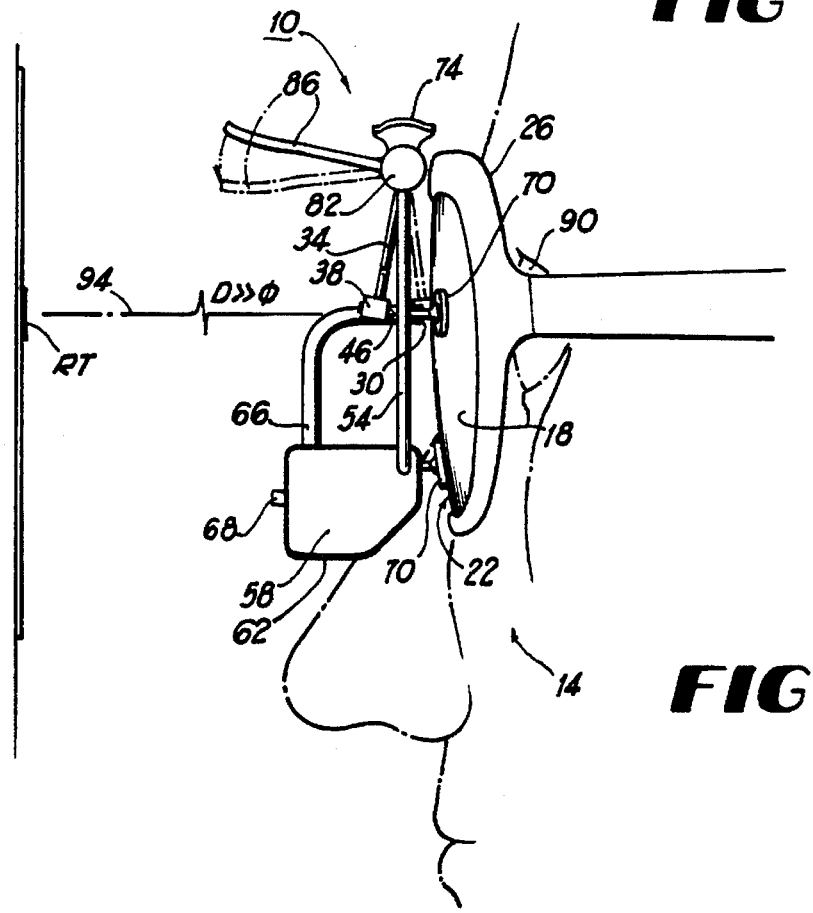
FIG. 2 is a side elevational view of the apparatus of FIG. 1.

FIGS. 1–2 detail an embodiment of the apparatus 10 of the present invention designed to allow subjective determination of the proper positioning of progressive power or other corrective lenses. As shown in FIGS. 1–2, apparatus 10 may be positioned by patient 14 against or immediately adjacent the exterior surface 18 of a lens 22 contained within spectacles 26. New spectacles 26 frequently include a plane simulator lens which may serve as lens 22, although apparatus 10 may be used in connection with the patient's existing spectacles 26 if prescriptive or other lenses are in place. Alternatively, as disclosed in U.S. Pat. No. 4,206,549 to Gould, lens 22 may be cut or stamped from a sheet of plastic and fitted into or otherwise secured to spectacles 26.

Apparatus 10 includes a light source 30, a marking rod 34, and two marking elements 38 and 42 associated with the marking rod 34 and positioned so that their respective tips 46 and 50 are equidistant from light source 30. The ability of the patient to mark lens 22 at two points equidistant light source 30 forms a significant feature of the invention, as bisection of a real or imaginary line drawn between the two points provides the reference from which progressive power or other corrective lens may be precisely positioned or fitted.

Also included as part of apparatus 10 are frame 54, compartment 58, thumb rest 62, stem 66, feet 70, finger rests 74 and 78, bar 82, and actuator arm 86. As illustrated in FIGS. 1,4, frame 54 may be molded or otherwise constructed substantially in a "U" shape and made of any suitable material such as plastic or metal. Frame 54 also may be designed so that the distance between prongs corresponds approximately to or is slightly less than the average width of lens 22 in order not to obstruct the vision of patient 14 significantly. Compartment 58 forms the bottom of frame 54 and may be used to house a battery or other power source for light source 30. Compartment 58 also may include a depression or other thumb rest 62 as its lower surface in order to allow patient 14 to stabilize apparatus 10 when positioned in his or her field of view.

Extending upward from compartment 58 and housing light source 30 is a thin stem 66. Light source 30, which typically may be a small fiber optic channel or a light-emitting diode (LED), is used as a target for the patient 14. Consequently, as best shown in FIG. 2, stem 66 extends beyond the plane defined by the prongs of "U"-shaped frame 54 so that light source 30 may be positioned against or closely proximate exterior surface 18 of lens 22. Stem 66 also serves to sheathe the electrical connections (which may be made via switch 68) between light source 30 and the power source in compartment 58 and, like frame 54, is designed to obstruct little of the patient's vision.

Feet 70, as illustrated in FIGS. 1–2, may be utilized to assist stabilization of apparatus 10 while in use. Any nonabrasive material such as felt or Teflon having a sufficient coefficient of friction to prevent undesired movement of apparatus 10 may form the surface of feet 70, which may be attached to either or both of frame 54 and compartment 58 and oriented to fit substantially flush with the exterior surface of lens 22. Also designed to assist patient 14 in stabilizing apparatus 10 are finger rests 74 and 78 associated with bar 82, which bar 82 is connected near each end to the prongs of "U"-shaped frame 54 and forms the upper section of apparatus 10. Patient 14 typically places a forefinger on one of finger rests 74 and 78 to counteract the upward force generated by the presence of his or her thumb on thumb rest 62.

Movement of marking rod 34 and elements 38 and 42 is accomplished using actuating lever or arm 86. In one embodiment of the invention consistent with FIGS. 1–2, included within bar 82 is a torsion spring associated with actuating arm 86. Referring principally to FIG. 2, in its unactuated position arm 86 lies slightly above the horizontal plane including the center of bar 82, while tips 46 and 50 of marking elements 38 and 42 rest a short distance from exterior surface 18 of lens 22. When patient 14 presses on arm 86, however, typically with the middle finger of the hand holding apparatus 10, the torsion spring stresses and marking rod 34 moves in an arcuate path sufficient to allow tips 46 and 50 (which may be inked felt, grease pencil, or other suitable devices) to contact and mark the exterior surface 18 of lens 22. Once pressure on arm 86 is released, the torsion spring relaxes and returns tips 46 and 50 and arm 86 to their resting positions.

Although FIG. 2 shows marking rod 34 as rigidly attached to actuator arm 86 at an angle of approximately 90°, any appropriate angle may exist between these components. Optimal results likely will be achieved, however, if the travel requirements of marking rod 34 are minimized. Similarly, those having ordinary skill in the art will recognize that actuation means including elements other than a torsion spring may be used to assist forward and return movement of marking rod 34. For example, arm 86 may be designed merely to rotate about bar 82, with sufficient friction existing between arm 86 and bar 82 to require some force to be provided by patient 14 to cause marking rod 34 to contact the exterior surface 18 of lens 22. Marking precision, however, probably will be increased if the amount of force required to be supplied by patient 14 is small.

Operation of apparatus 10, discussed principally relative to the left eye 90 of patient 14 and its corresponding visual axis or primary line of sight 94, may be described as follows. Initially, spectacles 26 should be fitted to patient 14. Although apparatus 10 may be used whether or not spectacles 26 are pre-fitted, adjustment of spectacles 26 after one or both of the lenses 22 are marked may result in improper positioning of the progressive power or other corrective lenses.

Once spectacles 26 are comfortably fitted, patient 14 may grasp apparatus 10 with the forefinger of his or her left hand placed on finger rest 74 and thumb placed on thumb rest 62. Patient 14 then, preferably while standing or sitting and with his or her head in its primary position, fixates (using both left and right eyes 90 and 98, respectively) on a remote target RT such as a chart, picture, or other suitable object located along primary line of sight 94. While fixating on the remote object patient 14 positions apparatus 10 so that light source 30 is located immediately adjacent exterior surface 18 of lens 22 and centered along primary line of sight 94. Once light source 30 is centered patient 14 actuates arm 86, typically with his or her left middle finger, and causes marking rod 34 to contact lens 22 at two points along its exterior surface 18. Lens 22 may then be used as a model for creating the progressive power or other corrective lens to be fitted into the corresponding section of spectacles 26.

A similar procedure may be followed in connection with the right eye 98 of patient 14, with the patient 14 typically grasping apparatus 10 in his or her right hand with its forefinger positioned on finger rest 78. Moreover, those having ordinary skill in the art will recognize that apparatus 10 may be modified to allow simultaneous or concurrent marking of lenses 22 associated with both the left and right eyes 90 and 98. Apparatus 10 similarly may be modified so that it clips onto or is otherwise attached to the exterior portion of spectacles 26 if desired. Additional marking elements and tips may be added to, for example, allow triangulation of the reference point for the final corrective lenses. Alternatively, apparatus 10 may be modified so that a single (very thin) marking tip is aligned with the center of light source 30 and thereby is capable of making a single mark corresponding to the exact location of the corrective lens reference point. Light source 30 similarly may be modified so that, for example, it clips to the nasal bridge of spectacles 26 and extends away from patient 14, in which case the patient 14 may view the light source 30 in a distant mirror. In each case, however, apparatus 10 is designed so that a known or determinable relationship exists between the locations marked on lens 22 and the point on lens 22 through which patient 14 aligned light source 30.

Because apparatus 10 is designed to obstruct very little of the vision of patient 14, his or her peripheral vision remains intact and allows binocular fusion to occur, thereby avoiding introduction of accuracy-reducing phoria. Stabilizing apparatus 10, decreasing the amount of force required to move actuating arm 86, and limiting the travel distance of marking rod 34 further improve the accuracy of the resulting measurements by minimizing movement of spectacles 26 relative to apparatus 10 while in use. If the vision of patient 14 is extremely poor when a simulated plane or a non-optimal prescriptive lens is used as lens 22, the remote object on which patient 14 fixates may itself be illuminated or otherwise acted upon to be more easily seen. By minimizing the errors associated with traditional objective positioning devices, apparatus 10 allows the precise location where a power change or other appropriate component of the corrective lens should exist or begin to be obtained merely by bisecting an imaginary or real line drawn to connect the two marks on lens 22 or otherwise determining the relationship between the mark or marks and the point on lens 22 through which patient 14 aligned light source 30.

FIGS. 3–8 detail alternate embodiments of the present invention. Each of apparatus 310, 410, 510, and 610 includes a light source and associated marking means and functions similar to apparatus 10. Apparatus 310 of FIG. 3, for example, comprises a light source 330, frame 354, compartment 358, thumb (or (middle) finger) rest 362, stem 366, electrical switch 368, feet 370, (middle) finger (or thumb) rest 374, actuator arm 386, and a torsion spring stressed when arm 386 is actuated, typically using the patient's forefinger. Apparatus 310 also includes two marking elements 338 and 342 and corresponding marking tips 346 and 350. Unlike the marking elements 38 and 42 of apparatus 10, however, marking elements 338 and 342 are connected to a pair of marking rods 334a and 334b, both of which are actuated by arm 386 via a flexible cable or other suitable transmitting device. Moreover, each of feet 370 positioned near the top of the prongs of "U"-shaped frame 354 houses a trunnion about which marking rods 334a and 334b pivot while guided by tracks 388. Although marking rods 334a and 334b as illustrated in FIG. 3 must travel farther than rod 34 of FIGS. 1–2 to contact the exterior surface 18 of lens 22, their resting positions thereby are a greater distance from the primary line of sight 94 of patient 14.

FIG. 4 details another embodiment of the present invention in which the actuating mechanism includes arm 486, torsion spring 490, rack gear 492, pinion gear 494, flexible cable 496, and trunnions 498. Depressing actuator arm 486 stresses torsion spring 490 and causes the teeth of rack gear 492 to engage corresponding teeth of pinion gear 494. Flexible cable 496 associated with pinion gear 494 transmits the movement, thereby causing marking rods 434a and 434b to pivot about trunnions 498 while guided by tracks 488. Apparatus 410 also includes light source 430, marking elements 438 and 442 having tips 446 and 450 respectively, frame 454, compartment 458, thumb (or (middle) finger) rest 462, stem 466, momentary switch 468 (which also serves as a (middle) finger (or thumb) rest), and feet 470.

Figures 5, 6:
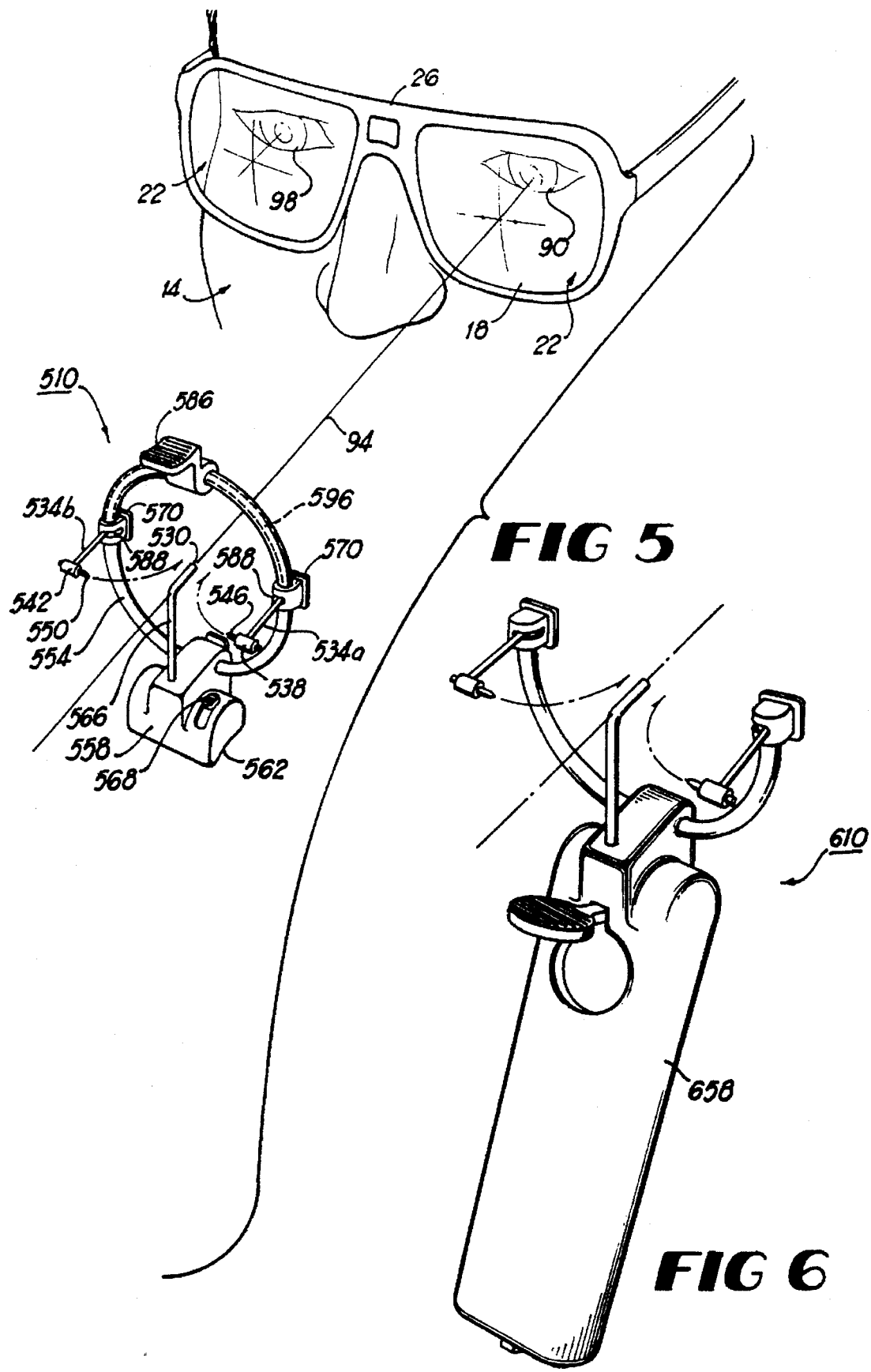
FIG. 5 is a perspective view of a third alternate embodiment of the apparatus of the present invention.
FIG. 6 is a perspective view of a fourth alternate embodiment of the apparatus of the present invention having an attached handle.

FIG. 5 illustrates an alternate embodiment of the present invention having a circular frame 554 and a combined actuator arm and forefinger rest 586. Other components of apparatus 510 shown in FIG. 5 include light source 530, marking rods 534a and 534b, marking elements 538 and 542, marking tips 546 and 550, compartment 558, thumb rest 562, stem 566, switch 568, feet 570, tracks 588, and flexible cable 596. Finally, FIG. 6 details an apparatus 610 nearly identical to apparatus 310 of FIG. 3 to which compartment 658 has been extended to form a handle. To use apparatus 610, patient 14 merely grasps handle or compartment 658 in the palm of his or her hand.

Illustrated in FIGS. 7–8 is an embodiment of the present invention in which apparatus 710 utilizes a solenoid 714 to actuate a push rod 718 connected via actuator arm 722 and actuator shaft 726 to markers 734a and 734b. Apparatus 710 additionally includes light source 730 (which may include one or more LEDs and, when suitable, be used in conjunction with filters such as different colored cellophane or similar strips) and a fiber optic channel 732 for conveying light emitted from light source 730 to a location central (or otherwise appropriate) to markers 734a and 734b. Also shown as forming apparatus 710 are feet 770 and spring 738 intermediate solenoid 714 and push rod 718.

Electrically connected to apparatus 710 through cable 738 is activator module 742. Module 742 contains power source 746 for light source 730 and a normally open, momentary switch 768 for forming the electrical connection between power source 746 and solenoid 714. Rheostat 750 also may be electrically connected between power source 746 and light source 730 if desired to adjust the intensity of light source 730, and thumb knob 754 may be used to provide power to light source 730 and vary the resistance of rheostat 750.

Apparatus 710 is designed so that its handle 774 may be held by patient 14 in one hand. Module 742 may be held in the other hand of patient 14 or alternatively by the practitioner, decreasing the possibility of apparatus 710 being jarred or moving when switch 768 is depressed and lens 22 marked. With light emitted through channel 732 centered (or otherwise appropriately positioned) relative to primary line of sight 94, switch 768 may be depressed to activate solenoid 714. Solenoid 714 in turn actuates push rod 718, permitting arm 722 to rotate shaft 726 and cause markers 734a and 734b to contact the exterior surface 18 of lens 22. Spring 738 accommodates any overtravel of the plunger of solenoid 714 and permits markers 734a and 734b to retract immediately after marking lens 22.

Figure 9:
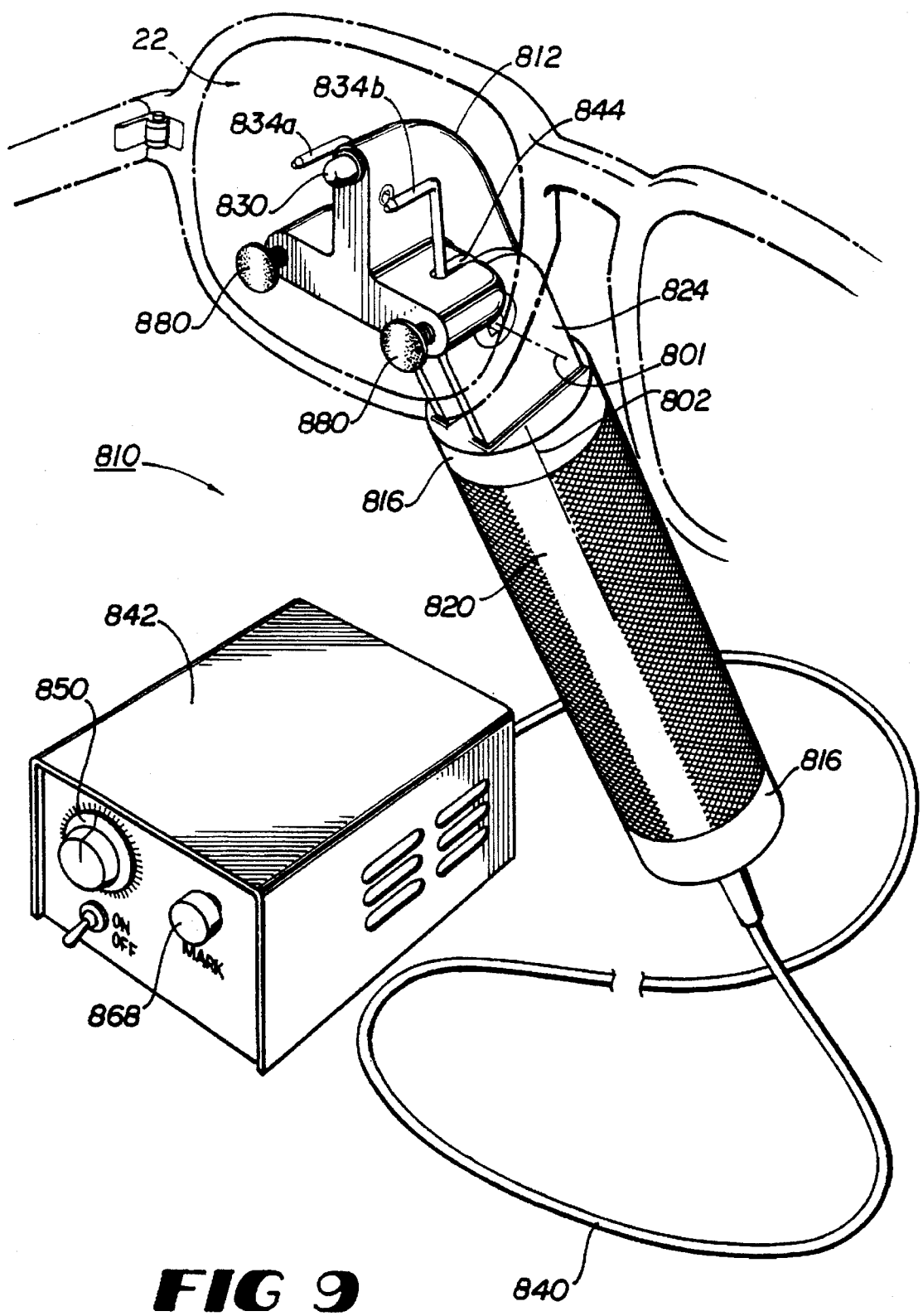
FIG. 9 is a perspective view of a sixth alternate embodiment of the apparatus of the present invention.
Figure 10:
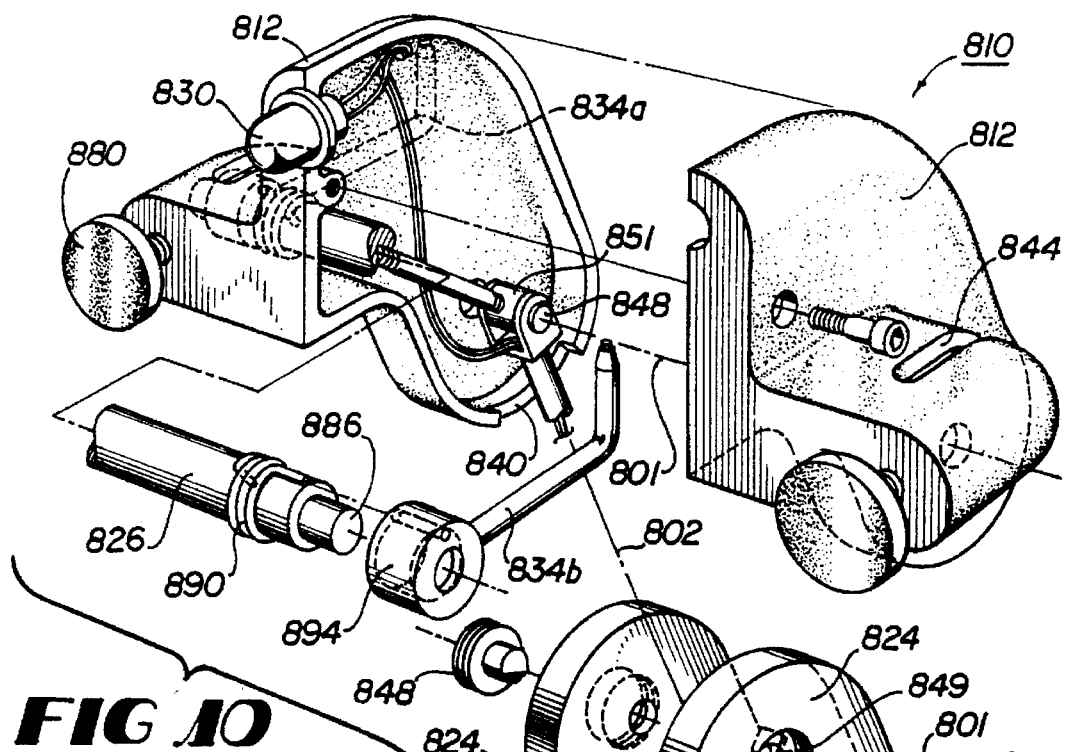
FIG. 10 is an exploded perspective view of the apparatus of FIG. 9.
Figure 11:
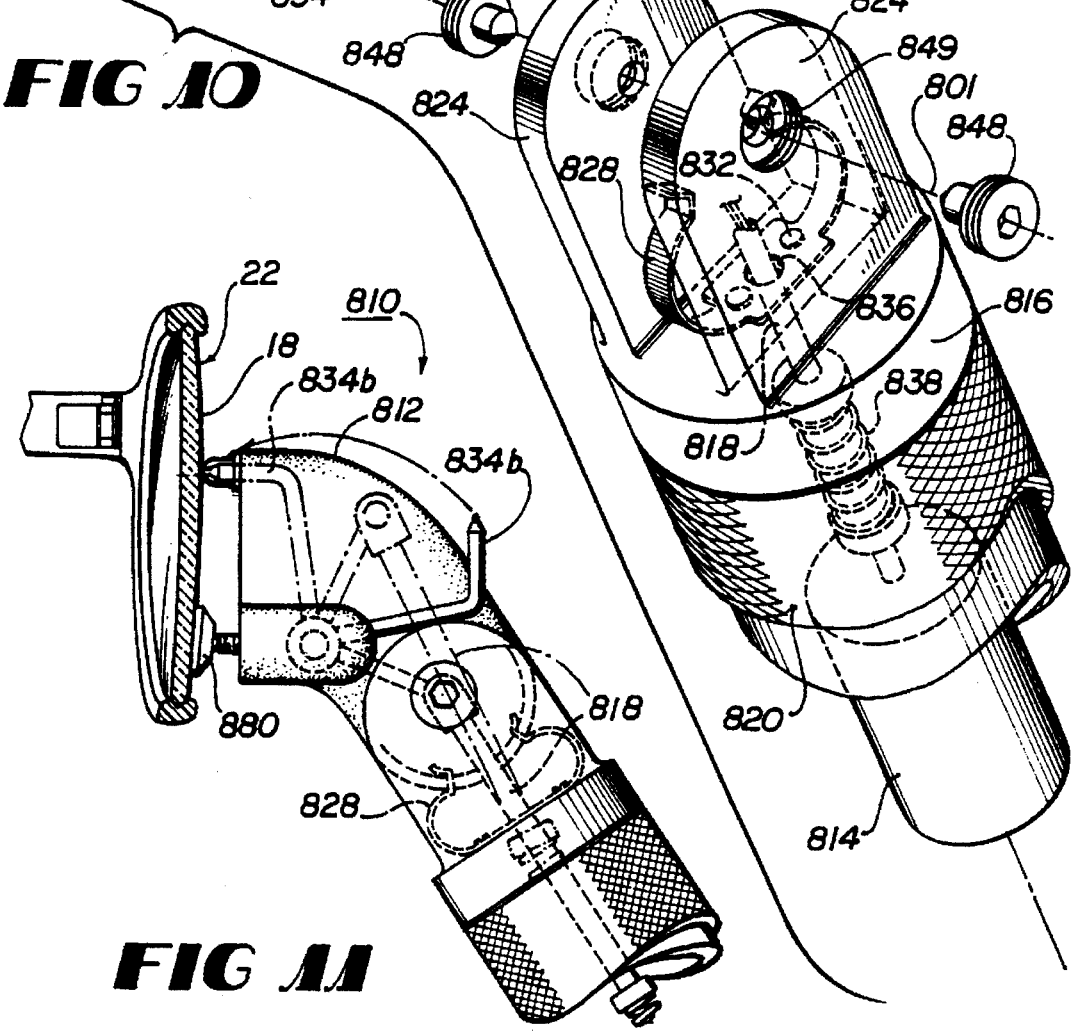
FIG. 11 is a side elevational, partially sectioned view of the apparatus of FIG. 9.

FIGS. 9–11 show an embodiment of the present invention in which apparatus 810 is free to pivot about at least two axes 801 and 802 to facilitate placement and seating on the exterior surface 18 of lens 22. Apparatus 810 includes a head 812, a body 816 with a reduced diameter portion encircled by sleeve 820, and collars 824 which may be integrally formed with body 816 and partially enclose leaf spring 828. Spring 828, shown attached to body 816 with fasteners 832 (such as rivets), defines aperture 836 through which push rod 818 passes. Pivot pins 848 (one of which is shown) engage corresponding apertures 849 of collars 824 and boss 851, permitting rotation of head 812 about axis 801, while spring 828 (inserted into slot 844 of head 812) serves to bias head 812 in a particular, "neutral" position. Rotation about axis 802 is accomplished by movement of sleeve 820 relative to body 816.

Among the other components illustrated in FIGS. 9–11 are solenoid 814, push rod 818, (pivot) shaft 826, light source 830, marking rods 834a and 834b, (overtravel) spring 838, cable 840, activator module 842, rheostat 850, momentary switch 868, and feet 880. These components, as will be recognized by those skilled in the art, correspond to components described above, permitting operation of apparatus 810 by, for example, patient 14 (e.g. FIGS. 1–2). FIGS. 9–11 also include slots 882, in which marking rods 834 travel, and trunnion 886, torsion spring 890, and arm journal 894 (each attached to or forming part of shaft 826) which cooperatively permit movement of marking rods 834 and bias the marking rods 834 to a neutral position. Torsion springs 890 allow continued travel of one of marking rods 834a or 834b relative to the other if necessary, as when asymmetrical curvatures of lenses requires. As illustrated in FIG. 11, in their neutral position marking rods 834 may be inked if necessary or desired merely by inverting apparatus 810 and having marking rods 834 contact an inking material.

Because head 812 is free to rotate about multiple axes, patient 14 may seat apparatus 810 on the exterior surface 18 of lens 22 with minimal effort. Patient 14 need not, for example, hold apparatus 810 with (nominally longitudinal) axis 802 perpendicular to the floor, since head 812 will rotate into an appropriate position as one or both feet 880 contact lens 22. Similarly, patient 14 may hold apparatus 810 comfortably, since sleeve 820 permits rotation of body 816.

FIGS. 12–15 illustrate an embodiment of the present invention in which apparatus 910 is designed to be held by the practitioner. Apparatus 910 generally includes housing 912, headrest assembly 914, and (one or more) lens detectors 916 and 918. Apparatus 910 may also include at least one level sensor 920, shown in FIG. 15 as a pair of mercury switches 922 and 924. These components collectively inhibit movement of patient 14 relative to apparatus 910 and assist the practitioner in levelling housing 912 and positioning it adjacent the exterior surface 18 of at least one lens 22.

Figure 12:
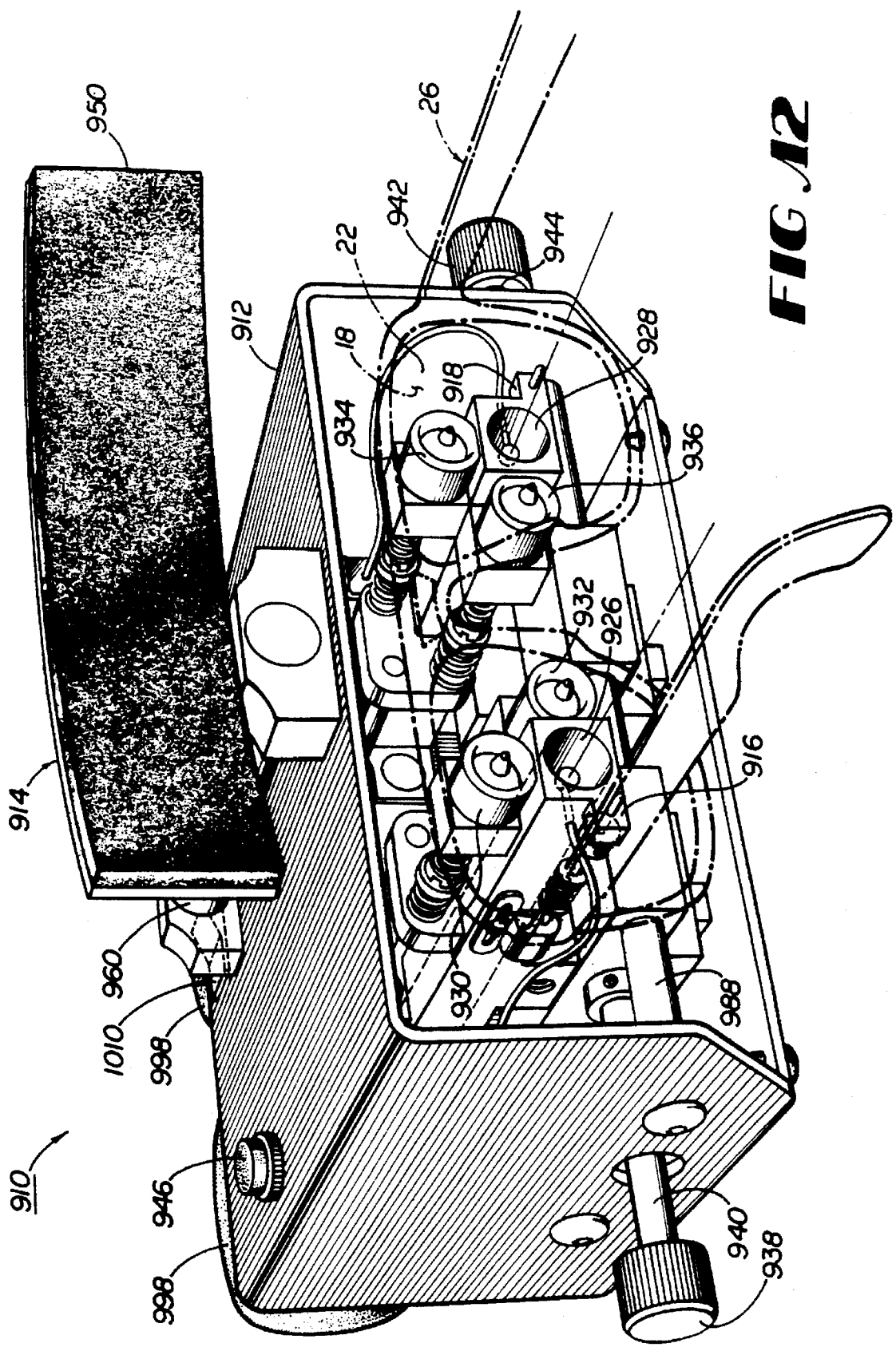
FIG. 12 is a perspective view of an embodiment of the apparatus of the present invention designed to be activated principally by the practitioner.

FIG. 12 also shows left and right sight tubes 926 and 928. Adjacent left sight tube 926 are left marker assemblies 930 and 932, while right marker assemblies 934 and 936 are adjacent right sight tube 928. Knob 938 and shaft 940 permit left sight tube 926 to be adjusted in two dimensions. A similar knob 942 and shaft 944 permit two-dimensional adjustment of right sight tube 928. Momentary switches 946 and 948 activate left and right marker assemblies 930 and 932, respectively, for marking one or both lenses 22.

Headrest assembly 914 includes rest 950, against which patient 14 positions his forehead, connection shaft 952, and base 954 attached to housing 912. Connection shaft 952 is adapted to swivel at joint 956 and, once swivelled into position, can be fixed in place using set screw 958. Connection shaft 952 also is received by tube 960 (through slot 962) and capable of sliding within the tube 960. Spring 964 within tube 960 may be used to bias rest 950 toward patient 14, typically causing patient 14 to tighten head and upper body muscles and assert sufficient counterpressure against rest 950 to maintain his head erect. This action also reduces undesired movement of the patient's head relative to housing 912 during the marking process.

Figure 15:
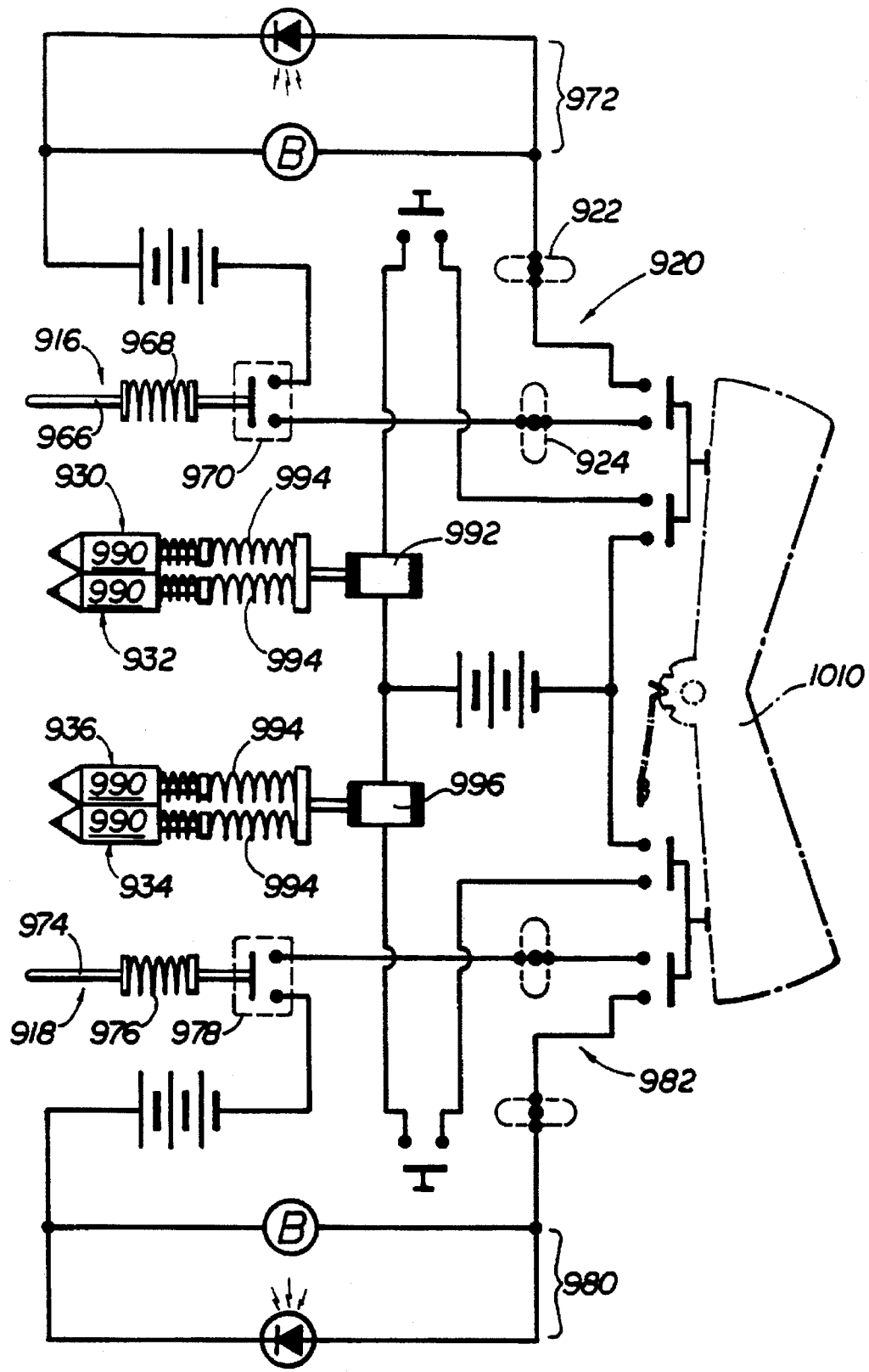
FIG. 15 is a schematicized representation of a portion of the apparatus of FIG. 12.

Lens detector 916 may be a rod 966 adjacent left sight tube 926, connected to both spring 968 and switch 970, and used to provide suitable audio or visual indicators 972 that contact with lens 22 has occurred. These indicators 972 also assist the practitioner in knowing when housing 912 is sufficiently close to lens 22 to ensure it is marked when he closes momentary switch 946 to activate left marker assemblies 930 and 932. Lens detector 918 functions similar to lens detector 916, includes rod 974 connected to spring 976 and switch 978, and can provide appropriate alarm indicators 980. In the embodiment of FIGS. 12–15, lens detectors 916 and 918 are positioned so that rods 966 and 974 parallel left and right sight tubes 926 and 928 and left and right marker assemblies 930, 932, 934, and 936. Mercury switches 922 and 924 are designed to complete the circuitry associated with indicators 972 and provide the practitioner confirmation that apparatus 910 is level in both the horizontal and vertical planes. A second level sensor 982 is shown in FIG. 15 and can be included as part of apparatus 910 if desired.

Left sight tube 926 (and its associated left marker assemblies 930 and 932 and left lens detector 916) can be adjusted horizontally and vertically relative to the visual axis 94 of patient 14. Rotating knob 938, for example, moves pinion gear 984 relative to rack gear 986, permitting vertical adjustment of left sight tube 926. Guide rods 988 additionally permit lateral adjustment of left sight tube 926 when knob 938 is pushed or pulled relative to housing 912. Similar operations on knob 942 permit adjustment of right sight tube 928 and its associated right marker assemblies 934 and 936 and right lens detector 918.

Figure 13:
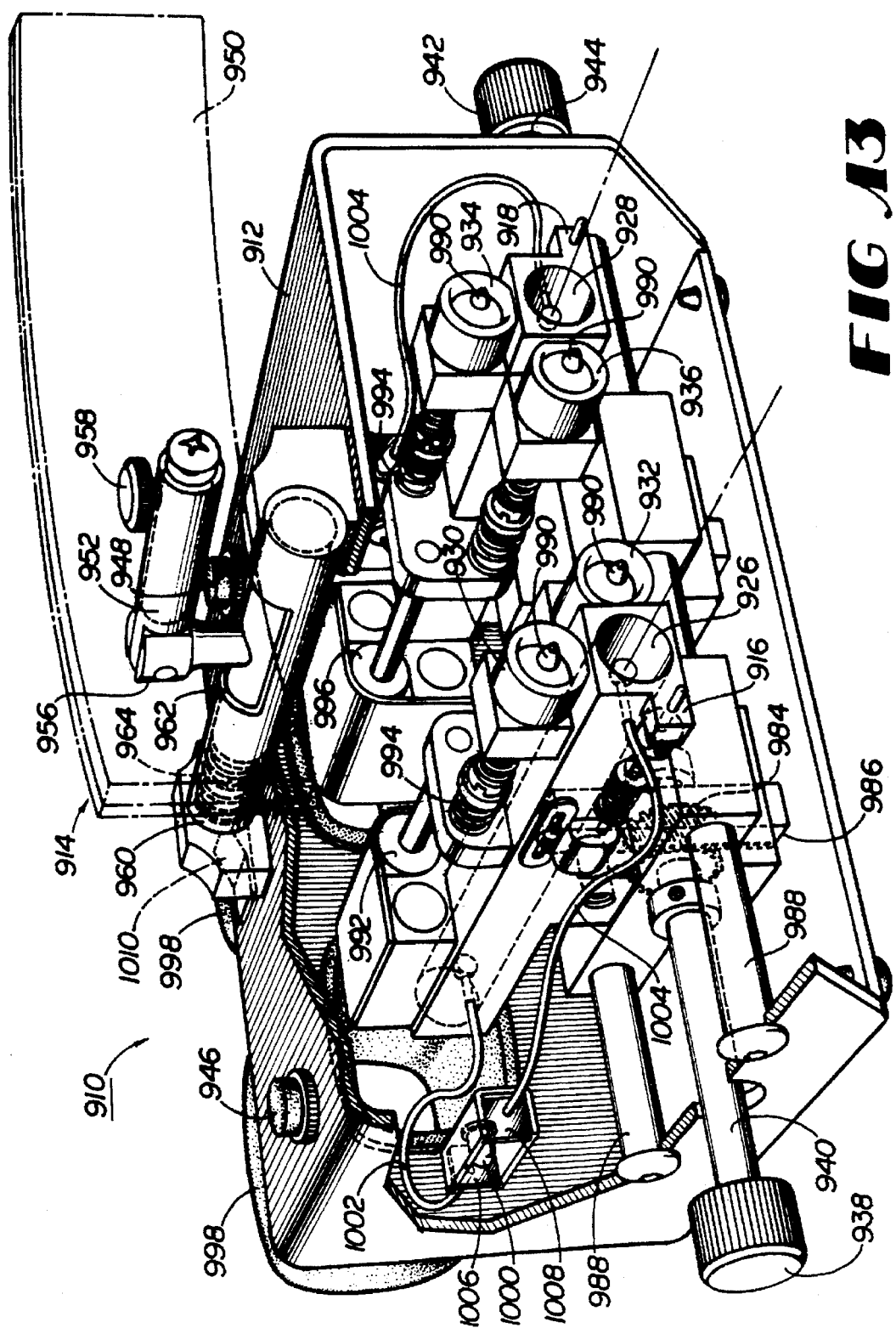
FIG. 13 is another perspective view of the apparatus of FIG. 12 shown partially cut away.
Figure 14:
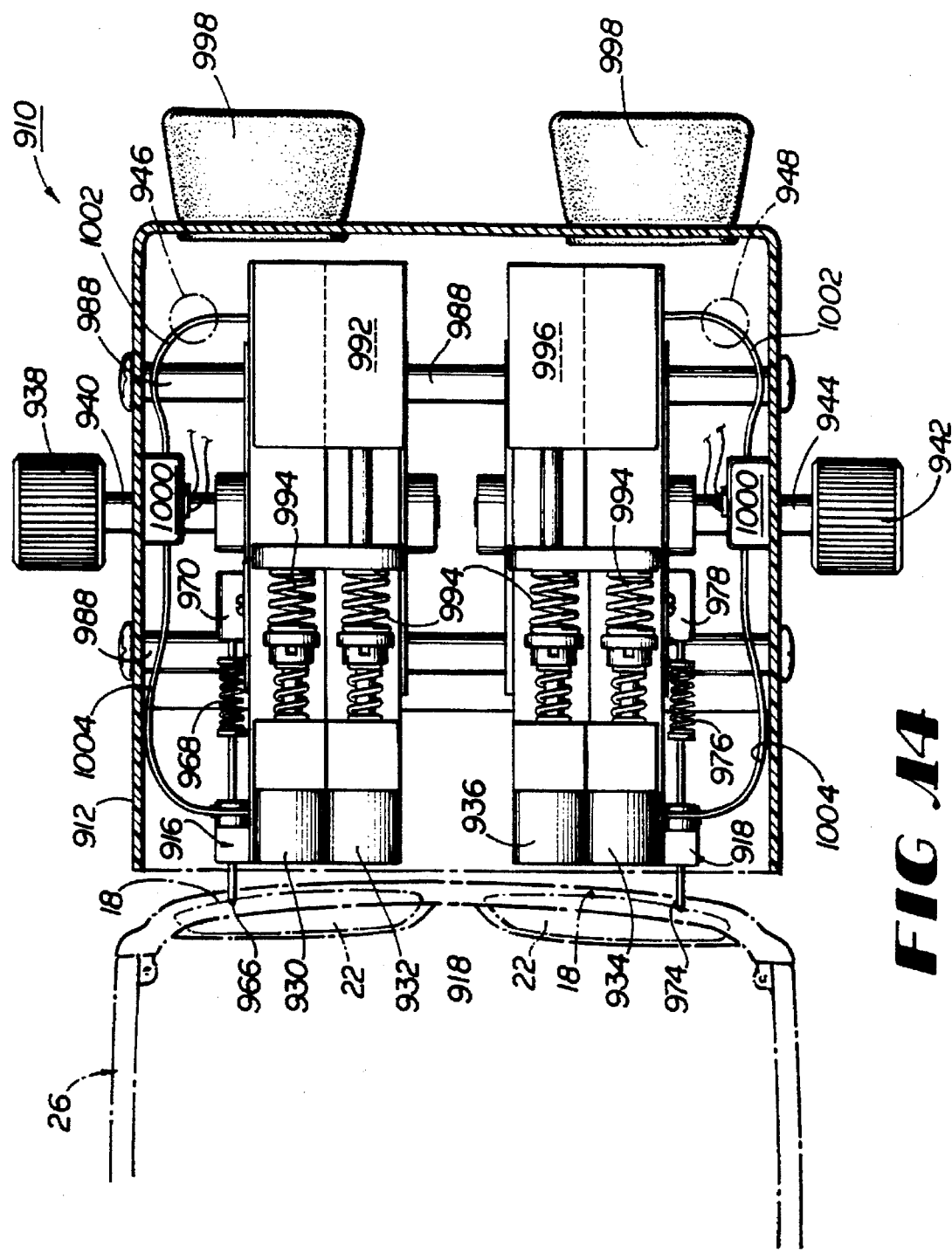
FIG. 14 is a (top) plan view of the apparatus of FIG. 12 shown cut away.

FIGS. 12–15 additionally detail left and right marking assemblies 930, 932, 934, and 936. Left marking assemblies 930 and 932 each comprise a marking pen or other indicating instrument 990, are connected to solenoid 992 for simultaneous operation, and can include (overtravel) springs 994. Right marking assemblies 934 and 936 are likewise constructed and connected to a single solenoid 996. Also shown in FIGS. 12–13 are eye cups 998 opposite housing 912 from marking pens 990, facilitating use of apparatus 910 by the practitioner, and a light source 1000 for each of the left and right sight tubes 926 and 928. In embodiments of the invention consistent with FIGS. 12–15, light source 1000 projects into fiber optic channels 1002 and 1004 terminating within their respective left or right sight tubes 926 or 928. Lenses 1006 and 1008 may also be used to project different colors of light (e.g. red and green or blue and yellow) into channels 1002 and 1004.

Nominal operation of apparatus 910 will be described in connection with marking the left lens 22 of patient 14. Marking the right lens 22 of patient 14 is performed in a similar manner, however, and apparatus 910, with minor modifications, can be used to mark both lenses 22 simultaneously if desired.

With selector switch 1010 appropriately positioned for activating left marking assemblies 930 and 932, the practitioner seats the forehead of patient 14 on rest 950. Sighting though eye cups 998 and left sight tube 926, the practitioner also preliminarily aligns the left sight tube 926 with the left eye 90 of patient 14. As housing 912 is brought near (left) lens 22, protruding rod 966 contacts exterior surface 18, causing it to push against spring 968 and close switch 970. The practitioner also adjusts knob 938 and levels housing 912 as necessary to close mercury switches 922 and 924. These actions activate indicators 972, signalling the practitioner that apparatus 910 is appropriately positioned for marking left lens 22, and can also activate light source 1000 if not already triggered. As the practitioner finely adjusts the position of left sight tube 926, patient 14 is instructed to notify him when left eye 90 (and visual axis 94) is aligned with the two colored lights projecting into the left sight tube 926 from channels 1002 and 1004. The practitioner then closes momentary switch 946, activating solenoid 992 and causing the marking pens 990 of left marking assemblies 930 and 932 to contact and mark (left) lens 22. Because the distance and angular relationship between left marking assemblies 930 and 932 is known, the location of the center of the left eye 90 (and corresponding visual axis 94) of patient 14 relative to lens 22 can be determined easily from the two marks using, for example, a grid.

Apparatus 1110 of FIGS. 16–19 is designed to indicate the line of sight 94 of patient 14 wearing spectacles 26 and maintain its position relative to lens 22 of spectacles 26 temporarily. Apparatus 1110 thus allows the practitioner to mark lens 22 after removing spectacles 26 from patient 14, facilitating examination and reducing the possibility of marking errors caused by patient movement. Use of two apparatuses 1110 additionally permits the lines of sight 94 of left and right eyes 90 and 98 of patient 14 to be determined concurrently. In such cases only after patient 14 is satisfied that both apparatuses 1110 accurately indicate primary lines of sight 94 would the practitioner remove spectacles 26 and mark lenses 22. Because until then patient 14 can reposition apparatus 1110 as desired, he can correct any errors that arise before either lens 22 is marked (unlike the Gould device).

Figure 16:
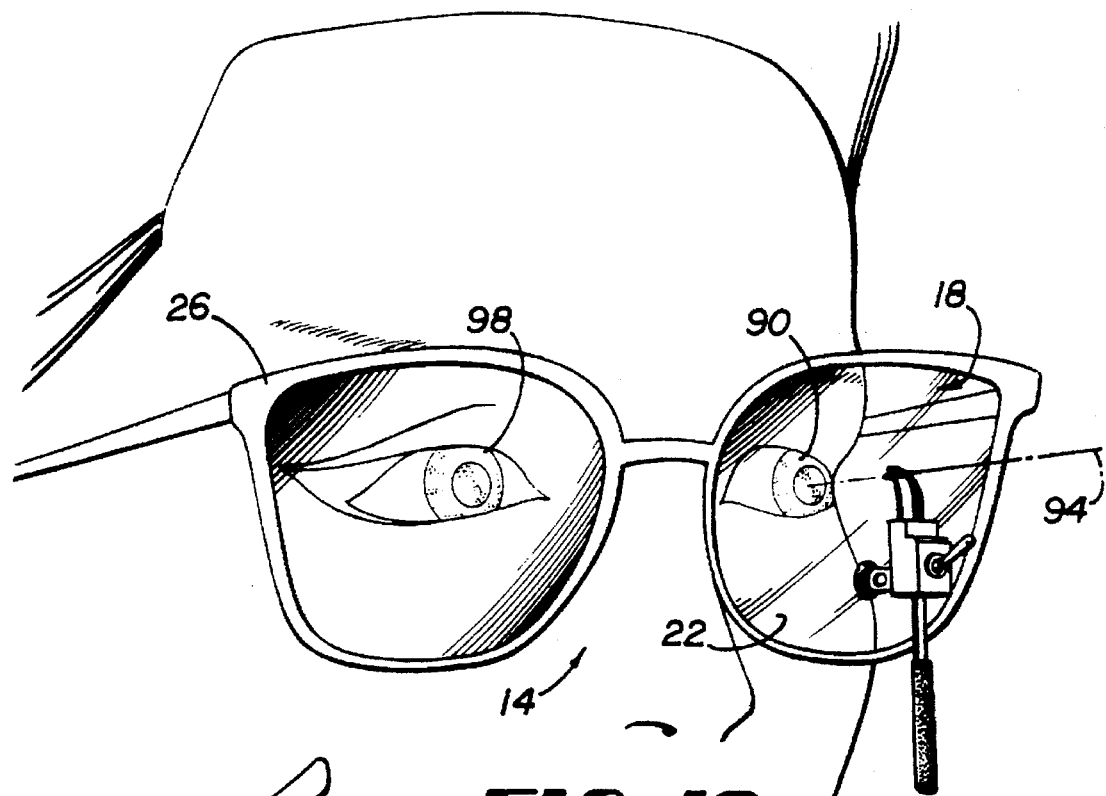
FIG. 16 is a perspective view of an embodiment of the apparatus of the present invention designed to permit the practitioner to mark the spectacle lenses after removing the spectacles from the patient.
Figure 17:
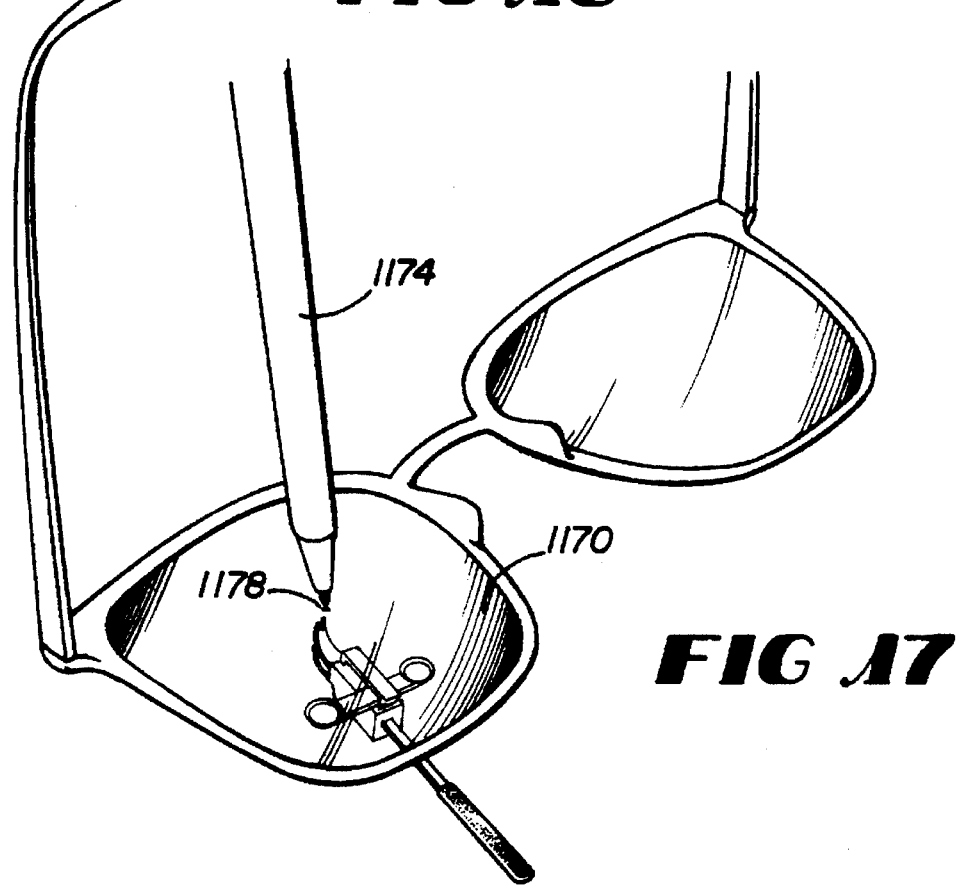
FIG. 17 is a perspective view of the apparatus of FIG. 16 shown positioned adjacent a spectacle lens for marking of the lens.
Figures 18, 19:
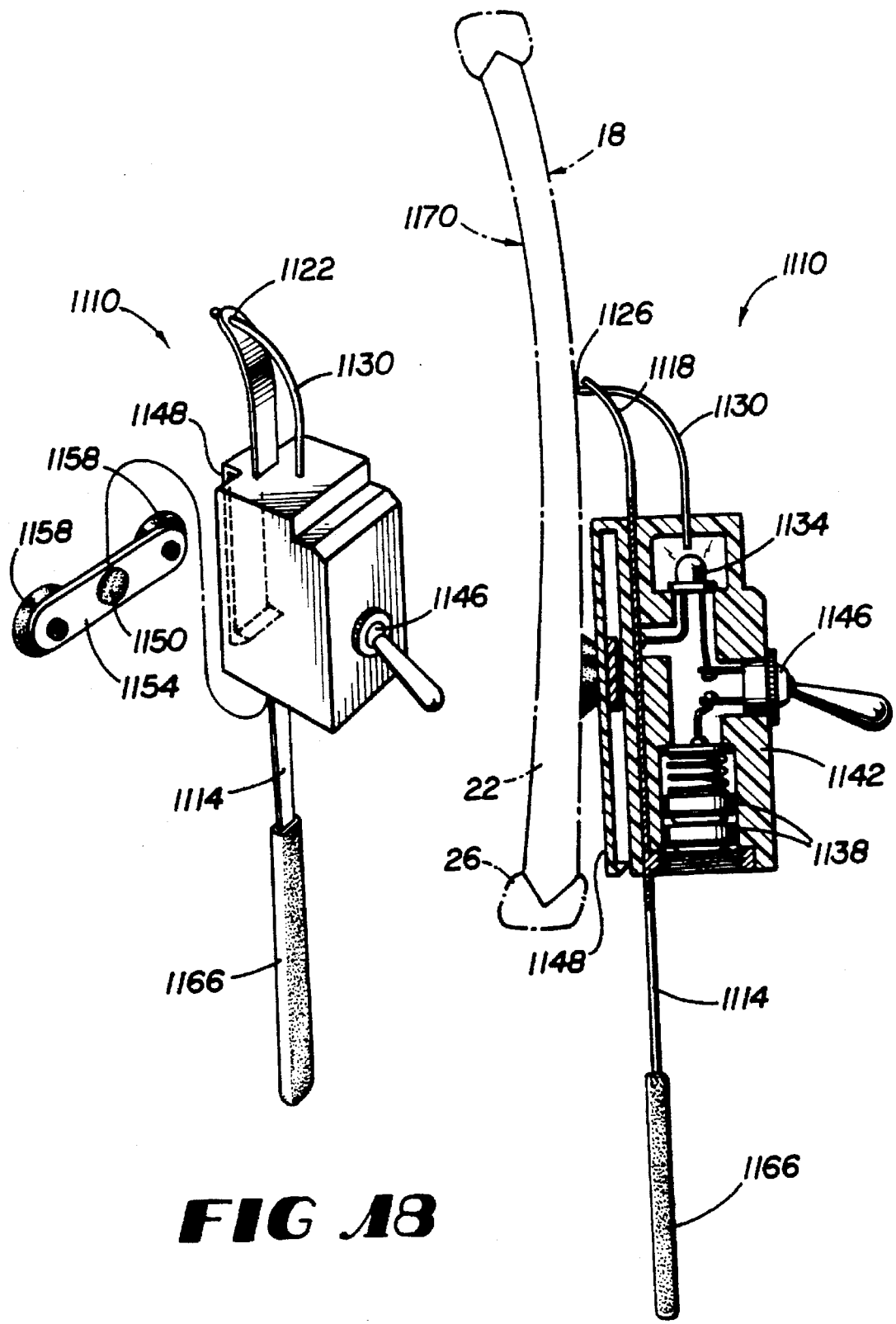
FIG. 18 is another perspective view of the apparatus of FIG. 16.
FIG. 19 is a side elevational, partially sectioned view of the apparatus of FIG. 16.

As depicted in FIGS. 16–19, apparatus 1110 includes rod 1114 curved at end 1118. End 1118 defines an opening 1122 for receiving the tip 1126 of fiber optic channel 1130, permitting fiber optic channel 1130 to convey light from a light-emitting diode or other light source 1134 to the exterior surface 18 of lens 22. Apparatus 1110 additionally includes battery 1138 (or an alternative power source) for illuminating light source 1134, shown in FIG. 19 within housing 1142. Also shown in FIGS. 16 and 18–19 is switch 1146 which, if present, may be used to connect light source 1134 to battery 1138. Incorporating a metallic strip 1148 onto housing 1142 permits it to be attracted to magnet 1150 of bar 1154 (see FIG. 18), which in turn may be attached to exterior surface 18 of lens 22 using suction cups 1158. Unlike that of the Gould device, therefore, magnet 1150 will not contact either left eye 90 or right eye 98 of patient 14. Moreover, including suction cups 1158 on bar 1154 permits it to remain fixed on exterior surface 18 notwithstanding movement of apparatus 1110, avoiding the need to slide a magnetically clamped plate across the (interior) surface of the spectacle frames as described in the Gould patent.

To use apparatus 1110 for left eye 90 while wearing spectacles 26, patient 14 (or the practitioner) initially attaches the bar 1154 to the exterior surface 18 of lens 22 utilizing suction cups 1158. Holding apparatus 1110 at the end 1166 of rod 1114 opposite end 1118, patient 14 illuminates light source 1134 (by, for example, toggling switch 1146) and fixates on a remote target located along primary line of sight 94. Patient 14 then positions apparatus 1110 so that tip 1126 is adjacent exterior surface 18 of lens 22 and light emitted from tip 1126 is centered along primary line of sight 94. Patient 14 then rotates end 1166 (if necessary) to cause strip 1148 to contact magnet 1150, permitting the magnetic attraction between strip 1148 and magnet 1150 to retain apparatus 1110 in position. If patient 14 subsequently becomes dissatisfied with the position of apparatus 1110 (as when movement or other actions misalign light source 34 and primary line of sight 94), however, he need merely grasp end 1116 of rod 1114, exert enough force to overcome the magnetic attraction, and reposition apparatus 1110 as appropriate.

Using a second apparatus 1110 allows a similar procedure to be performed concurrently for right eye 98. In some embodiments light sources 1134 in the two apparatuses 1110 may provide light of different colors (e.g., red from one and green from the other). Patient 1114 may then be instructed to fixate on the remote target and position the apparatuses 1110 until both the red and green images (for example) from light sources 1134 are superimposed on the remote target. Should movement of patient 14 while positioning the second apparatus 1110 disturb the relationship between the first apparatus 1110 and the primary line of sight 94 of the associate eye, for example, the images from light sources 1134 will not both be superimposed on the remote target. Patient 14 may then reposition either or both apparatuses 1110.

After the procedure is completed for either or both of left and right eyes 90 and 98, spectacles 26 can be removed from patient 14 with apparatuses 1110 intact and light sources 1134 illuminated. Viewing light sources 1134 through lenses 22, the practitioner (or even patient 14 if desired) can mark the interior surfaces 1170 of lenses 22 opposite light sources 1134 using a conventional marker 1174 (and return spectacles 26 to patient 14 for verification). Apparatus 1110 thus provides a device for subjectively determining the relationship between the pupils of patient 14 and a single point 1178 on each lens 22 of corresponding spectacles 26. Unlike the subjective embodiment of the Gould device (which uses an opaque plate), apparatus 1110 neither blocks the peripheral vision of patient 14 nor prevents binocular fusion from occurring.

As shown principally in FIG. 19, the curvature of end 1118 of rod 1114 permits tip 1126 to protrude from opening 1122 approximately perpendicular and adjacent to the exterior surface 18 of lens 22 when strip 1148 contacts magnet 1150. Strip 1148 is also sufficiently wide or appropriately shaped to prevent it from rolling or rotating when contacting magnet 1150. Alternatively, if rod 1114 is made of metal, strip 1148 can be omitted and the rod 1114 itself attracted to magnet 1150.

FIGS. 20–24 depict apparatus 1200, an alternative to apparatus 1110 of FIGS. 16–19. Apparatus 1200 includes bar 1204 separating (typically metal) rods 1208 and 1212, which permit the lines of sight 94 of left and right eyes 90 and 94 to be determined concurrently using a single device. Like those associated with apparatus 1110, rods 1208 and 1212 terminate in curved ends 1216 and 1220, respectively, each defining an opening 1224A or 1224B for receiving a tip 1228A or 1228B of a fiber optic channel 1232A or 1232B through which light may be conveyed. Apparatus 1200 additionally may include a housing 1236 and switch 1240 relating to each rod 1208 and 1212 for connecting a suitable power source, such as a battery, to a light source.

Figure 20:
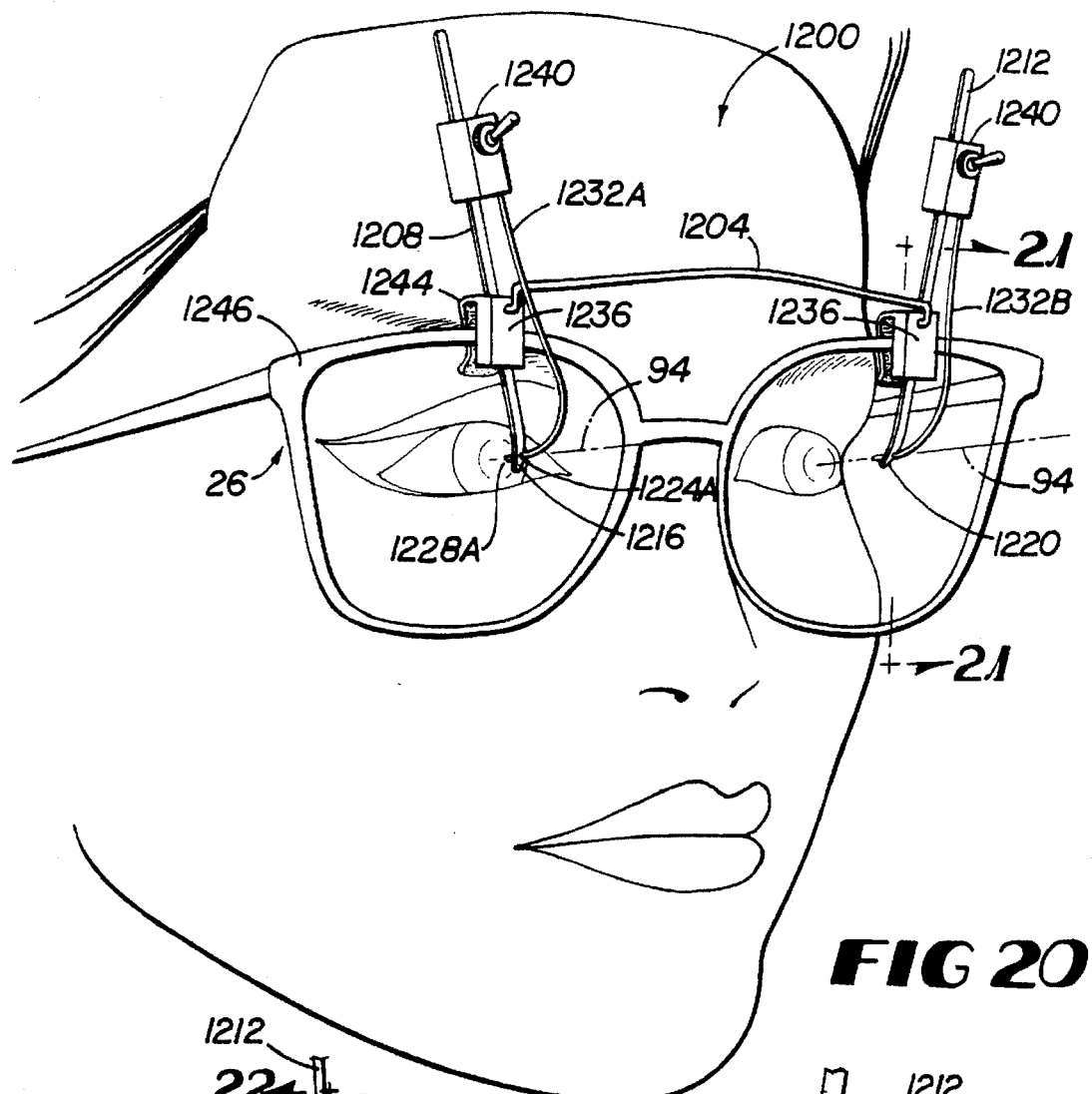
FIG. 20 is a perspective view of an alternate embodiment of the present invention designed to permit the practitioner to mark spectacle lenses after removing the spectacles from the patient.
Figures 21, 22:
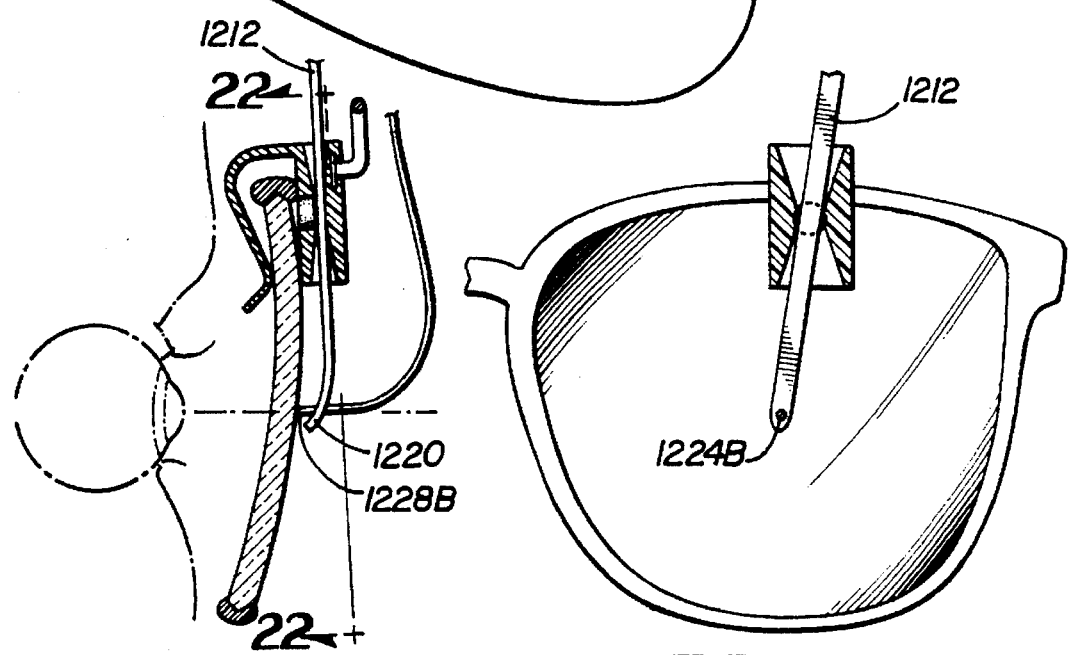
FIG. 21 is a cross-sectional view of the apparatus of FIG. 20 taken along line 21—21.
FIG. 22 is a cross-sectional view of the apparatus of FIG. 20 taken along line 22—22 of FIG. 21.
Figures 23, 24:
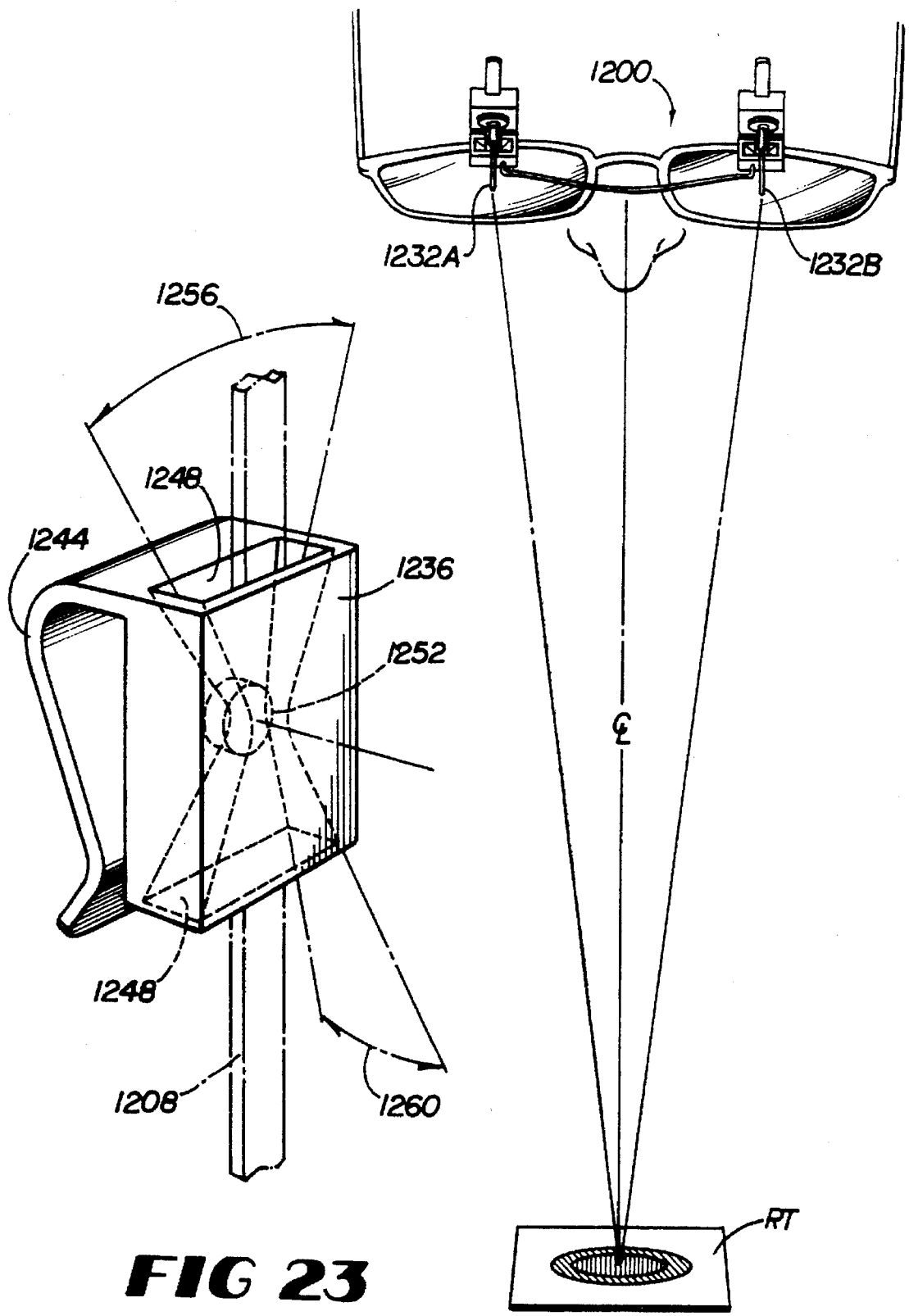
FIG. 23 is a perspective view of a portion of the apparatus of FIG. 20.
FIG. 24 is an illustration of a patient wearing the apparatus of FIG. 20 and viewing a remote target.

As shown in FIGS. 20–21 and 23, each housing 1236 includes a clip 1244 for attaching to the frame 1246 of spectacles 26. Attaching clips 1244 to the spectacles 26 retains apparatus 1200 in position relative to patient 1114 while lines of sight 94 are being determined, increasing the accuracy of the resulting markings. Within each housing 1236 is formed a channel 1248 and adhered a magnet 1252, to which respective rods 1208 and 1212 are attracted and about which they may pivot in use. Because the depth of the (generally X-shaped) channel 1248 is greater than the thickness of rods 1208 and 1212, rods 1208 and 1212 may pivot not only from side-to-side (as indicated by arrows 1256), but also toward and away from lenses 22 (as indicated by arrows 1260). Rods 1208 and 1212 also may be repositioned vertically when necessary. Once rods 1208 and 1212 are pivoted and repositioned by patient 1114 (or practitioner), however, the magnetic force provided by magnet 1252 retains rods 1208 and 1212 in place even when spectacles 26 are removed for marking. Alternatively or additionally, associated electronic or telecommunications equipment could sense the location of the rods 1208 and 1212 relative to spectacles 26 and store the information or transmit it directly to a lens-manufacturing operation for use.

As described in connection with FIGS. 16–19, the light sources associated with rods 1208 and 1212 may provide light of different colors if desired (e.g., red from one and green from the other). Patient 1114 may then be instructed to fixate on a remote target RT and position rods 1208 and 1212 until both the red and green images (for example) from the light sources are superimposed on the remote target RT.

The foregoing is provided for purposes of illustration, explanation, and description of embodiments of the present invention. Various modifications to and adaptations of the embodiments, including those discussed earlier, will be apparent to those of ordinary skill in the art and may be made without departing from the scope or spirit of the invention. Verification procedures, furthermore, may be included as part of the present invention. Once a lens is marked, for example, opaque cellophane tape having a small diameter hole could be placed over the lens with the hole centered between the dual marks, with either the patient or practitioner determining whether the hole is aligned with the patient's visual axis. Finally, although the apparatus of the present invention shown in FIGS. 1–11 and 16–24 are designed to be held or manipulated by patient 14, and allow for precise positioning of corrective lenses when the subjective techniques described above are used, the apparatus may be held by the practitioner (like the apparatus of FIGS. 12–15) or attached to a stationary object if necessary, as when patient 14 lacks full hand or arm function.

I claim:

1. A device capable of being used by a patient having an eye and a visual axis associated with the eye and in connection with spectacles having a lens through which the visual axis may pass, comprising:

a. a moveable target shaped to minimize obstruction of the patient's vision and comprising a light source;

b. means, positionable adjacent the lens opposite the lens from the eye, for aligning the moveable target with the visual axis; and c. means, connected to the aligning means, for attaching the aligning means to a selected portion of the spectacles without preventing movement of the moveable target relative to the visual axis.

2. A device according to claim 1 in which the aligning means comprises:

a. a housing defining a channel;

b. a rod positioned at least partially in the channel; and c. means for permitting movement of the rod within the channel.

3. A device according to claim 2 in which the movement-permitting means comprises a magnet connected to the housing, magnetically attracted to the rod, and about which the rod pivots.

4. A device according to claim 3 in which the rod has a thickness and a width and the channel has a depth and a maximum width, which depth is greater than the thickness of the rod and which maximum width is greater than the width of the rod.

5. A device according to claim 4 in which the attaching means comprises a clip connected to the housing.

6. A device according to claim 5 in which the moveable target comprises a light source and is moveable in three dimensions relative to the visual axis.

7. A device according to claim 6 in which (1) the moveable target further comprises means, having first and second ends, for conveying light emitted by the light source from the first end to the second end and (2) the rod defines an aperture for receiving the second end of the conveying means.

8. A device according to claim 2 in which the attaching means comprises a suction cup connected to the housing.

9. A device capable of being used by a patient having a left eye with an associated left visual axis and a right eye with an associated right visual axis, and in connection with spectacles having left and right lenses through which the respective left and right visual axes may pass, comprising:

a. first and second moveable targets, each of which is moveable in three dimensions relative to the visual axis;

b. first means, positionable adjacent the left lens opposite the left lens from the left eye, for aligning the first moveable target with the left visual axis;

c. means, connected to the first aligning means, for attaching the first aligning means to the left lens without preventing movement of the first moveable target relative to the left visual axis;

d. second means, positionable adjacent the right lens opposite the right lens from the right eye, for aligning the second moveable target with the right visual axis;

e. means, connected to the second aligning means, for attaching the second aligning means to the right lens without preventing movement of the second moveable target relative to the right visual axis; and f. a bar connected to the first and second aligning means.

10. A device according to claim 9 in which each of the first and second aligning means comprise:

a. a housing defining a channel;

b. a rod positioned at least partially in the channel; and c. means for permitting movement of the rod within the channel.

11. A method, for a patient having an eye and a visual axis associated with the eye, of marking a lens (1) within the frame of spectacles worn by the patient, (2) having interior and exterior surfaces, and (3) through which the visual axis of the patient may pass, comprising the steps of:

a. attaching to the spectacles using attachment means a device comprising a moveable target positionable adjacent the exterior surface of the lens;

b. moving the moveable target so as to align it with the visual axis without moving the attachment means;

c. directing light through the moveable target;

d. removing the spectacles from the patient without moving the moveable target; and e. marking the interior surface of the lens at the location opposite the moveable target.

* * * * *